(12) United States Patent
Kusaka et al.

(10) Patent No.: US 12,500,387 B2
(45) Date of Patent: Dec. 16, 2025

(54) OPTICAL AMPLIFICATION APPARATUS

(71) Applicant: FUJIKURA LTD., Tokyo (JP)

(72) Inventors: Hiroyuki Kusaka, Chiba (JP); Masahiro Kashiwagi, Chiba (JP)

(73) Assignee: Fujikura Ltd., Tokyo (JP)

( * ) Notice: Subject to any disclaimer, the term of this patent is extended or adjusted under 35 U.S.C. 154(b) by 990 days.

(21) Appl. No.: 17/632,432

(22) PCT Filed: Sep. 2, 2020

(86) PCT No.: PCT/JP2020/033178
§ 371 (c)(1),
(2) Date: Feb. 2, 2022

(87) PCT Pub. No.: WO2021/045074
PCT Pub. Date: Mar. 11, 2021

(65) Prior Publication Data
US 2022/0285903 A1 Sep. 8, 2022

(30) Foreign Application Priority Data

Sep. 3, 2019 (JP) ................................ 2019-160575
Sep. 3, 2019 (JP) ................................ 2019-160645

(51) Int. Cl.
*H01S 3/00* (2006.01)
*H01S 3/067* (2006.01)
(Continued)

(52) U.S. Cl.
CPC ........ *H01S 3/06758* (2013.01); *H01S 3/0675* (2013.01); *H01S 3/094007* (2013.01);
(Continued)

(58) Field of Classification Search
CPC ............... H01S 3/06758; H01S 3/0675; H01S 3/094007; H01S 3/094011; H01S 3/094053; H01S 3/09415
See application file for complete search history.

(56) References Cited

U.S. PATENT DOCUMENTS 5,835,259 A 11/1998 Kakui et al.
9,482,821 B2 11/2016 Huber et al.
(Continued)

FOREIGN PATENT DOCUMENTS

CN 205863635 U 1/2017
JP H09-080492 A 3/1997
(Continued)

*Primary Examiner* — Mark Hellner
(74) *Attorney, Agent, or Firm* — Osha Bergman Watanabe & Burton LLP

(57) ABSTRACT

An optical amplification apparatus includes a first amplification optical fiber, a second amplification optical fiber, a first pumping light source, and a second pumping light source. The first amplification optical fiber includes a first core and a first cladding layer. The first core is doped with an active element using a first active element doping concentration distribution. The first cladding layer is disposed out of the first core and has a refractive index lower than the refractive index of the first core. The second amplification optical fiber is connected to the first amplification optical fiber in a longitudinal direction of the first amplification optical fiber. The second amplification optical fiber includes a second core and a second cladding layer. The second core is doped with active element using a second active element doping concentration distribution that is different from the first active element doping concentration distribution.

14 Claims, 14 Drawing Sheets

(51) Int. Cl.
*H01S 3/094* (2006.01)
*H01S 3/0941* (2006.01)

(52) U.S. Cl.
CPC .. *H01S 3/094011* (2013.01); *H01S 3/094053* (2013.01); *H01S 3/09415* (2013.01)

(56) References Cited

U.S. PATENT DOCUMENTS

| | | | |
|---|---|---|---|
| 2005/0179992 A1* | 8/2005 | Shimizu | H01S 3/094003 359/337 |
| 2016/0043525 A1* | 2/2016 | Ichige | H01S 3/0675 359/341.1 |
| 2016/0218477 A1* | 7/2016 | Savage-Leuchs | B29C 48/10 |
| 2020/0189029 A1 | 6/2020 | Ishiguro et al. | |

FOREIGN PATENT DOCUMENTS

| | | | |
|---|---|---|---|
| JP | 2002-359419 A | 12/2002 | |
| JP | 6419901 B1 | 11/2018 | |
| WO | 2004-075364 A1 | 9/2004 | |

* cited by examiner

OPTICAL AMPLIFICATION APPARATUS

CROSS REFERENCE TO RELATED APPLICATIONS

This application priority to Japanese Patent Application No. 2019-160645, filed Sep. 3, 2019, and Japanese patent application No. 2019-160645, filed Sep. 3, 2019, the contents of which are hereby incorporated herein by reference in their entirety.

TECHNICAL FIELD

The present invention relates to an optical amplification apparatus, and more particularly to an optical amplification apparatus that amplifies and outputs a laser beam.

BACKGROUND

Fiber laser apparatuses including optical amplification devices have rapidly spread in various fields such as marking or material processing because they are advantageous over conventional laser devices in that they have higher optical condensing capability and can use optical fibers, which can readily be routed. For example, when a metal material is processed with a fiber laser device, a high-power laser beam is directed to a workpiece to heat and melt the workpiece for welding, cutting, or the like. With such laser processing, it is important to change optical properties of a laser beam being applied depending on a material of a workpiece in order to improve processing performance such as a processing rate, a process quality, and the like.

As methods of changing a beam profile of a laser beam, there have been known a method of selecting a desired lens from among a plurality of lens corresponding to a plurality of beam profiles and changing a beam shape of a laser beam with lens optics including the selected lens (see, e.g., Patent Literature 1) and a method of directing a laser beam to different points on an end face of a multi-cladding fiber so as to change a beam profile of a laser beam (see, e.g., Patent Literature 2).

When those methods are used to change a beam profile of a laser beam outputted from a fiber laser device, a process of changing a beam profile is performed on a laser beam outputted from an optical amplifier in a fiber laser device. Therefore, a mechanism for changing a beam profile is required separately from the optical amplifier. Furthermore, the process of changing a beam profile may cause optical loss to the laser beam outputted from the optical amplifier and degrade the beam quality of the laser beam outputted from the optical amplifier.

PATENT LITERATURE

Patent Literature 1: JP 6419901 B
Patent Literature 2: U.S. Pat. No. 9,482,821

SUMMARY

One or more embodiments of the invention provide an optical amplification apparatus capable of outputting a laser beam having a desired beam profile without a particular mechanism for changing a beam profile.

According to one or more embodiments of the invention, there is provided an optical amplification apparatus capable of outputting a laser beam having a desired beam profile without a particular mechanism for changing a beam profile. This optical amplification apparatus has a first amplification optical fiber, a second amplification optical fiber connected to the first amplification optical fiber in a longitudinal direction of the first amplification optical fiber, a first pumping light source operable to generate first pumping light, and a second pumping light source operable to generate second pumping light. The first amplification optical fiber includes a first core to which an active element has been doped with a first active element doping concentration distribution and a first cladding layer located outside of the first core. The first cladding layer has a refractive index lower than a refractive index of the first core. The second amplification optical fiber includes a second core optically connected to the first core of the first amplification optical fiber and a second cladding layer located outside of the second core. The second cladding layer has a refractive index lower than a refractive index of the second core. The active element has been doped to the second core with a second active element doping concentration distribution different than the first active element doping concentration distribution. The first pumping light source is operable to allow the first pumping light to enter any of the first cladding layer in the first amplification optical fiber and the second cladding layer in the second amplification optical fiber. The second pumping light source is operable to allow the second pumping light to enter any of the first cladding layer in the first amplification optical fiber and the second cladding layer in the second amplification optical fiber.

BRIEF DESCRIPTION OF DRAWINGS

Embodiments of an optical amplification apparatus according to the present invention will be described in detail below with reference to FIGS. 1 to 17. In FIGS. 1 to 17, the same or corresponding components are denoted by the same or corresponding reference numerals and will not be described below repetitively. Furthermore, in FIGS. 1 to 17, the scales or dimensions of components may be exaggerated, or some components may be omitted.

FIG. 1 is a diagram schematically showing a fiber laser system 1 including an optical amplification apparatus according to a first embodiment of the present invention. As shown in FIG. 1. the fiber laser system 1 of this embodiment has an optical cavity 2 including an amplification optical fiber member 3, a plurality of first pumping light sources 31 operable to allow a pumping light beam $P_1$ to enter the optical cavity 2 from an upstream side of the optical cavity 2, an upstream optical combiner 41 operable to combine the pumping light beams $P_1$ from those first pumping light sources 31 and output the combined pumping light beams $P_1$ to the optical cavity 2, a plurality of second pumping light sources 32 operable to allow a pumping light beam $P_2$ to enter the optical cavity 2 from a downstream side of the optical cavity 2, a downstream optical combiner 42 operable to combine the pumping light beams $P_2$ from those second pumping light sources 32 and output the combined pumping light beams $P_2$ to the optical cavity 2, a delivery fiber 50 extending from the downstream optical combiner 42, a laser emission portion 51 provided on a downstream end of the delivery fiber 50, and a controller 60 operable to control the first pumping light sources 31 and the second pumping light sources 32 (e.g., electric currents supplied to the first pumping light sources 31 and the second pumping light sources 32). Unless otherwise mentioned herein, the term "downstream" refers to a direction in which a laser beam L is emitted from the optical cavity 2, and the term "upstream" refers to an opposite direction thereto.

The amplification optical fiber member 3 includes a first amplification optical fiber 10 located on an upstream side of the system and a second amplification optical fiber 20 connected to a downstream side of the first amplification optical fiber 10 in a longitudinal direction of the first amplification optical fiber 10. The first amplification optical fiber 10 and the second amplification optical fiber 20 are connected to each other at a fusion splice portion 52 by fusion splicing.

Figure 2:
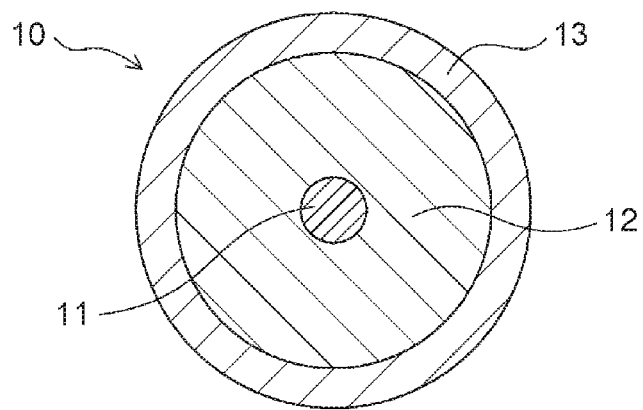
FIG. 2 is a cross-sectional view schematically showing a structure of a first amplification optical fiber in the fiber laser system illustrated in FIG. 1.

FIG. 2 is a cross-sectional view schematically showing a structure of the first amplification optical fiber 10. As shown in FIG. 2, the first amplification optical fiber 10 has a core 11 (first core), an inner cladding layer 12 (first cladding layer) that surrounds an outer circumference of the core 11, and an outer cladding layer 13 that surrounds an outer circumference of the inner cladding layer 12.

For example, the core 11 is formed by doping an element for increasing a refractive index, such as aluminum, to silica glass and further doping an active element to at least a portion of the silica glass. For example, the inner cladding layer 12 is formed of silica glass without any dopant being doped thereto. The inner cladding layer 12 has a refractive index lower than a refractive index of the core 11. Thus, an optical waveguide is formed within the core 11. For example, a relative refractive index difference between the core 11 and the inner cladding layer 12 is 0.32%. For example, the outer cladding layer 13 is formed of an ultraviolet curable resin. The outer cladding layer 13 has a refractive index lower than the refractive index of the inner cladding layer 12. Thus, an optical waveguide is also formed within the inner cladding layer 12. For example, the core 11 has a diameter of 30 μm, the inner cladding layer 12 has an outside diameter of 420 μm, and the outer cladding layer 13 has an outside diameter of 440 μm.

Examples of the active element doped to the core 11 include rare earth elements such as ytterbium (Yb), erbium (Er), thulium (Tm), and neodymium (Nd), bismuth (Bi), and chromium (Cr). The present embodiment describes an example in which Yb is doped to the core 11 of the first amplification optical fiber 10. Nevertheless, the present invention is not limited to this example.

Figure 3:
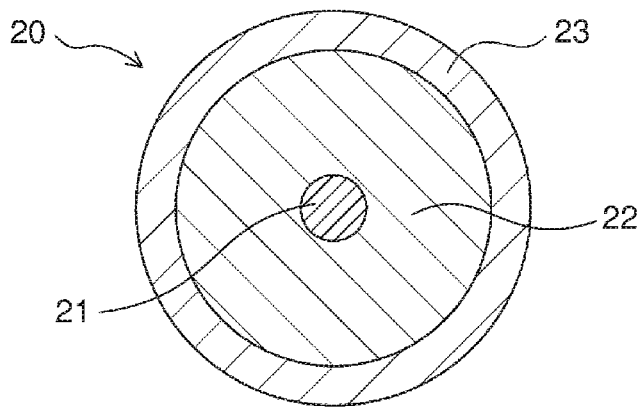
FIG. 3 is a cross-sectional view schematically showing a structure of a second amplification optical fiber in the fiber laser system illustrated in FIG. 1.

FIG. 3 is a cross-sectional view schematically showing a structure of the second amplification optical fiber 20. As shown in FIG. 3, the second amplification optical fiber 20 has a core 21 (second core), an inner cladding layer 22 (second cladding layer) that surrounds an outer circumference of the core 21, and an outer cladding layer 23 that surrounds an outer circumference of the inner cladding layer 22.

For example, the core 21 is formed by doping an element for increasing a refractive index, such as aluminum, to silica glass and further doping an active element to at least a portion of the silica glass. For example, the inner cladding layer 22 is formed of silica glass without any dopant being doped thereto. The inner cladding layer 22 has a refractive index lower than a refractive index of the core 21. Thus, an optical waveguide is formed within the core 21. For example, a relative refractive index difference between the core 21 and the inner cladding layer 22 is 0.32%. For example, the outer cladding layer 23 is formed of an ultraviolet curable resin. The outer cladding layer 23 has a refractive index lower than the refractive index of the inner cladding layer 22. Thus, an optical waveguide is also formed within the inner cladding layer 22. For example, the core 21 has a diameter of 30 μm, the inner cladding layer 22 has an outside diameter of 420 μm, and the outer cladding layer 23 has an outside diameter of 440 μm.

Examples of the active element doped to the core 21 include rare earth elements such as ytterbium (Yb), erbium (Er), thulium (Tm), and neodymium (Nd), bismuth (Bi), and chromium (Cr). The present embodiment describes an example in which Yb is doped to the core 21 of the second amplification optical fiber 20. Nevertheless, the present invention is not limited to this example. The active element doped to the core 11 of the first amplification optical fiber 10 may preferably be the same as the active element doped to the core 21 of the second amplification optical fiber 20.

In order to reduce optical loss at the fusion splice portion 52, the core 11 of the first amplification optical fiber 10 and the core 21 of the second amplification optical fiber 20 may preferably have the same outside diameter. Similarly, the inner cladding layer 12 of the first amplification optical fiber 10 and the inner cladding layer 22 of the second amplification optical fiber 20 may preferably have the same outside diameter.

Figure 1:
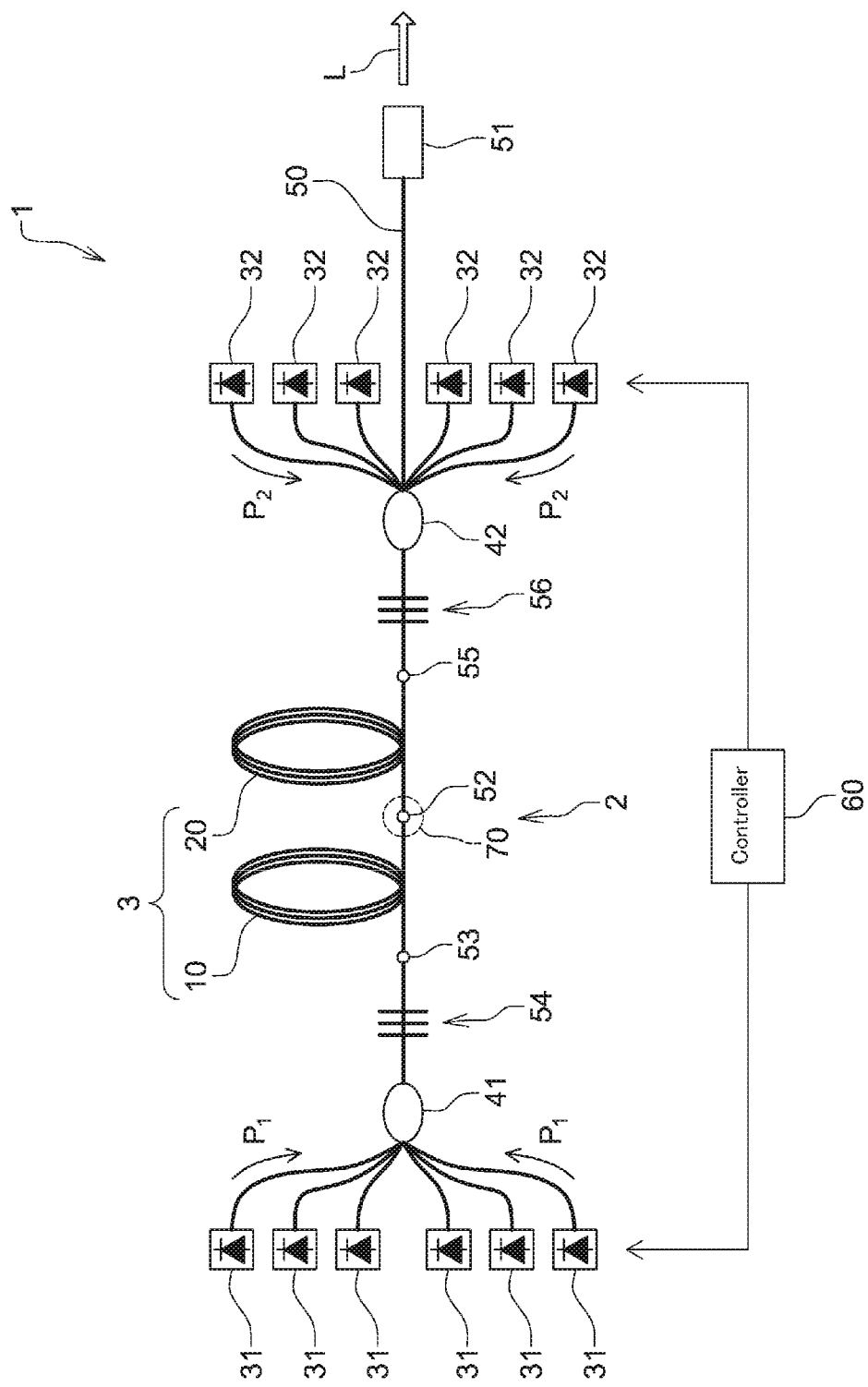
FIG. 1 is a diagram schematically showing a fiber laser system including an optical amplification apparatus according to a first embodiment of the present invention.

As shown in FIG. 1, the optical cavity 2 includes a high-reflectivity fiber Bragg grating portion (high-reflectivity FBG portion) 54 disposed between the first amplification optical fiber 10 and the upstream optical combiner 41 and a low-reflectivity fiber Bragg grating portion (low-reflectivity FBG portion) 56 disposed between the second amplification optical fiber 20 and the downstream optical combiner 42. The high-reflectivity FBG portion 54 is connected to the first amplification optical fiber 10 at a fusion splice portion 53 by fusion splicing. The low-reflectivity FBG portion 56 is connected to the second amplification optical fiber 20 at a fusion splice portion 55 by fusion splicing.

The high-reflectivity FBG portion 54 is formed of an optical fiber with a core having a refractive index varying in a periodical manner along an optical axis. The high-reflectivity FBG portion 54 reflects light having a certain wavelength range at a reflectivity near 100%. As with the high-reflectivity FBG portion 54, the low-reflectivity FBG portion 56 is formed of an optical fiber with a core having a refractive index varying in a periodical manner along an optical axis. The low-reflectivity FBG portion 56 allows a portion of light (e.g., 90%) in the wavelength range at which light is reflected by the high-reflectivity FBG portion 54 to pass therethrough and reflects the remainder of the light.

Each of the first pumping light sources 31 includes, for example, a Fabry-Perot semiconductor laser device formed of a GaAs-based semiconductor material and, for example, generates pumping light $P_1$ (first pumping light) having a center wavelength of 915 nm. Similarly, each of the second pumping light sources 32 includes, for example, a Fabry-Perot semiconductor laser device formed of a GaAs-based semiconductor material and, for example, generates pumping light $P_2$ (second pumping light) having a center wavelength of 915 nm. For example, electric currents supplied to the first pumping light sources 31 and the second pumping light sources 32 are controlled by the controller 60 to adjust the power of the pumping light $P_1$ generated by the first pumping light sources 31 and the power of the pumping light $P_2$ generated by the second pumping light sources 32.

The present embodiment describes an example in which the wavelength of the pumping light $P_1$ generated by the first pumping light sources 31 and the wavelength of the pumping light $P_2$ generated by the second pumping light sources 32 are 915 nm. Nevertheless, the wavelength of the pumping light $P_1$ and the wavelength of the pumping light $P_2$ are not limited to this example. Furthermore, the wavelength of the pumping light $P_1$ and the wavelength of the pumping light $P_2$ may not necessarily be the same and may be different from each other. For example, pumping light having wavelengths with different absorptances may be used for the pumping light $P_1$ and the pumping light $P_2$.

The upstream optical combiner 41 is configured to combine pumping light beams $P_1$ outputted from a plurality of first pumping light sources 31 and allow the combined pumping light beams $P_1$ to enter the inner cladding layer 12 of the first amplification optical fiber 10. Specifically, the pumping light beams $P_1$ enter the inner cladding layer 12 of the first amplification optical fiber 10 from an opposite side of the first amplification optical fiber 10 to the second amplification optical fiber 20. Furthermore, the downstream optical combiner 42 is configured to combine pumping light beams $P_2$ outputted from a plurality of second pumping light sources 32 and allow the combined pumping light beams $P_2$ to enter the inner cladding layer 22 of the second amplification optical fiber 20. Specifically, the pumping light beams $P_2$ enter the inner cladding layer 22 of the second amplification optical fiber 20 from an opposite side of the second amplification optical fiber 20 to the first amplification optical fiber 10.

In the optical cavity 2, when the pumping light $P_1$ propagating through the inner cladding layer 12 of the first amplification optical fiber 10 passes through the core 11, it is absorbed in Yb so that Yb is excited to produce spontaneous emission. Furthermore, when the pumping light beam $P_2$ propagating through inner cladding layer 22 of the second amplification optical fiber 20 passes through the core 21, it is absorbed in Yb so that Yb is excited to produce spontaneous emission. The spontaneous emission produced by excitation of Yb is recursively reflected between the high-reflectivity FBG portion 54 and the low-reflectivity FBG portion 56, so that light having a specific wavelength (e.g., 1064 nm) is amplified to cause laser oscillation. The laser beam L amplified by the optical cavity 2 propagates through the core 11 of the first amplification optical fiber 10 and the core 21 of the second amplification optical fiber 20. A portion of the laser beam L transmits through the low-reflectivity FBG portion 56 and propagates downstream. The laser beam L that has transmitted through the low-reflectivity FBG portion 56 propagates through the delivery fiber 50. Then laser beam L is emitted from the laser emission portion 51 toward, for example, a workpiece.

Thus, in the present embodiment, the first pumping light sources 31, the upstream optical combiner 41, the optical cavity 2, the downstream optical combiner 42, the second pumping light sources 32, and the controller 60 form an optical amplification apparatus that amplifies a laser beam and outputs the amplified laser beam.

The first amplification optical fiber 10 may preferably be long enough to ensure that at least 90% of the pumping light $P_1$ enters the inner cladding layer 12 of the first amplification optical fiber 10 from the first pumping light sources 31 is absorbed in the core 11 of the first amplification optical fiber 10. For example, the first amplification optical fiber 10 may have a length of at least 20 m. Furthermore, the second amplification optical fiber 20 may preferably be long enough to ensure that at least 90% of the pumping light $P_2$ enters the inner cladding layer 22 of the second amplification optical fiber 20 from the second pumping light sources 32 is absorbed in the core 21 of the second amplification optical fiber 20. For example, the second amplification optical fiber 20 may have a length of at least 20 m.

For an amplification optical fiber used in an optical amplification apparatus, it has been known that a propagation mode of light that propagates through the amplification optical fiber can selectively be amplified by varying a radial concentration distribution of an active element doped to a core, for example, as disclosed in JP 5159956 B. In the present embodiment, a radial concentration distribution of Yb doped to the core 11 of the first amplification optical fiber 10 (first active element doping concentration distribution) is different from a radial concentration distribution of Yb doped to the core 21 of the second amplification optical fiber 20 (second active element doping concentration distribution). Thus, a propagation mode of light selectively amplified in the first amplification optical fiber 10 is different from a propagation mode of light selectively amplified in the second amplification optical fiber 20.

Figure 4:
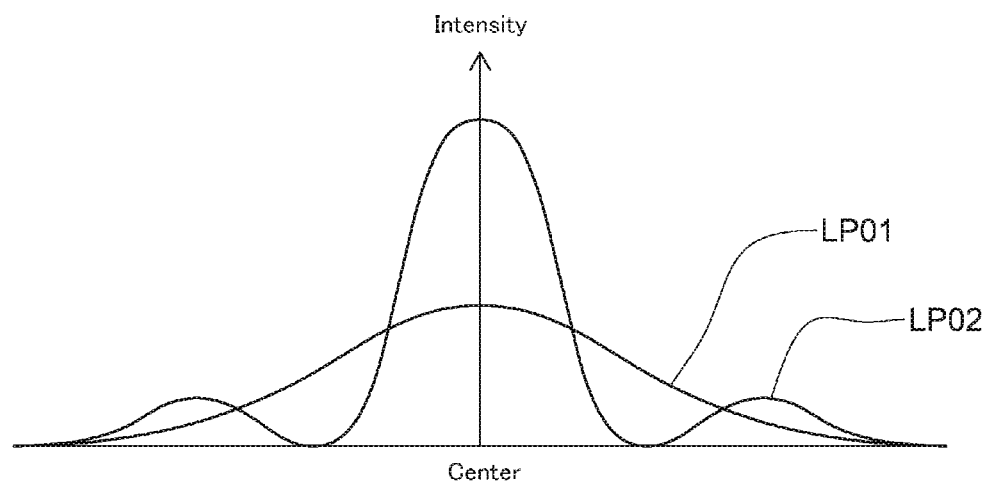
FIG. 4 shows intensity distributions obtained by normalizing an intensity of an LP01 mode propagating through a core of the first amplification optical fiber and an intensity of an LP02 mode propagating through the core of the first amplification optical fiber, respectively, by the power.

FIG. 4 shows intensity distributions obtained by normalizing an intensity of an LP01 mode propagating through the core 11 of the first amplification optical fiber 10 (fundamental propagation mode) and an intensity of an LP02 mode propagating through the core 11 of the first amplification optical fiber 10, respectively, by the power. As shown in FIG. 4, each of the LP01 mode and the LP02 mode has the highest intensity at the center of the core 11. The LP02 mode tends to increase more rapidly near the center of the core 11 as compared to the LP01 mode. The intensity of the LP02 mode is higher than that of the LP01 mode in a region around the center. An LP03 mode, which is a higher-order mode than the LP02 mode, has similar tendency.

Figure 5:
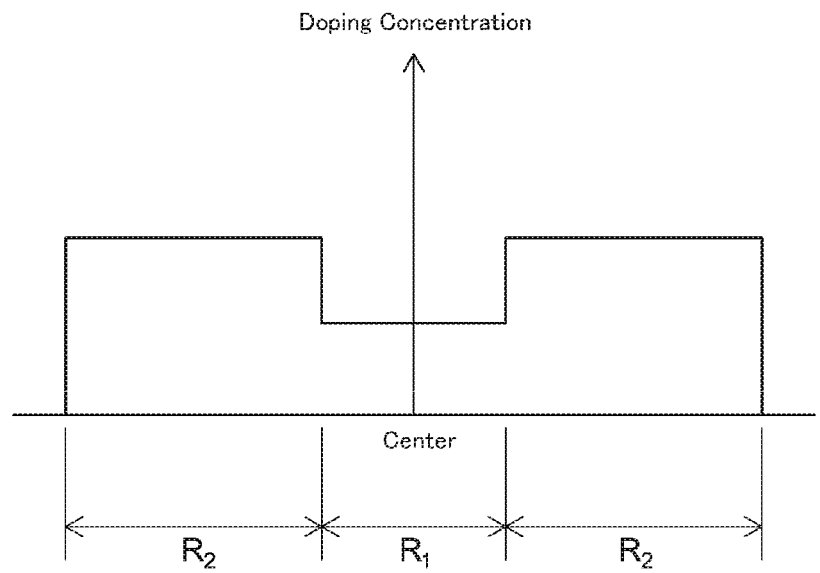
FIG. 5 is a diagram showing a radial concentration distribution of Yb doped to the core of the first amplification optical fiber illustrated in FIG. 2.

FIG. 5 is a diagram showing a radial concentration distribution of Yb doped to the core 11 of the first amplification optical fiber 10. As shown in FIG. 5, Yb is doped to the overall core 11 of the first amplification optical fiber 10. A concentration of Yb doped to a central area $R_1$ of the core 11 (for example, an area ranging from the center to a radius of 4 μm) is lower than a concentration of Yb doped to an area $R_2$ located radially outside of the central area $R_1$. For example, Yb is doped to the central area $R_1$ of the core 11 at 1.0 wt % to silica glass and to the outer area $R_2$ of the core 11 at 2.0 wt % to silica glass.

As described above, the intensity of the LP02 mode and the LP03 mode is relatively higher within an area around the center of the core 11 in the first amplification optical fiber 10. As shown in FIG. 5, the doping concentration of Yb in the central area $R_1$ of the core 11 is lower than that in the outer area $R_2$. Stimulated emission of Yb due to the LP02 mode and the LP03 mode is suppressed in the central area $R_1$, where the intensity of the LP02 mode and the LP03 mode is higher than that of the LP01 mode. As a result, the LP01 mode, which is the fundamental propagation mode, is more intensely amplified in the core 11 of the first amplification optical fiber 10 as compared to the LP02 mode and the LP03 mode, which are higher-order propagation modes.

Figure 6:
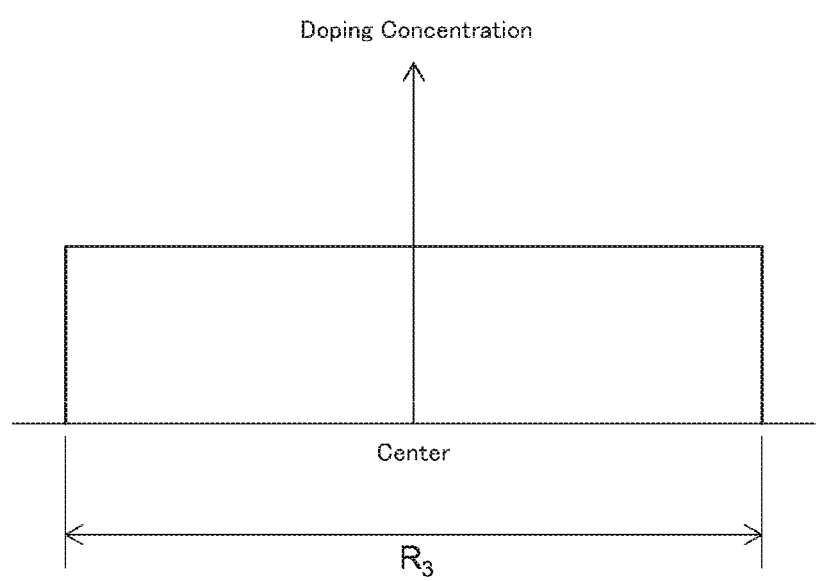
FIG. 6 is a diagram showing a radial concentration distribution of Yb doped to a core of the second amplification optical fiber illustrated in FIG. 3.

FIG. 6 is a diagram showing a radial concentration distribution of Yb doped to the core 21 of the second amplification optical fiber 20. As shown in FIG. 6, Yb is doped to the overall core 21 of the second amplification optical fiber 20. The concentration of Yb doped to the core 21 is the same in an overall area $R_3$ ranging from the center to an outer periphery. For example, Yb is doped to the overall area $R_3$ of the core 21 at 2.0 wt % to silica glass. In this manner, the concentration of Yb doped to the core 21 of the second amplification optical fiber 20 is the same in the overall area $R_3$. Therefore, not only the LP01 mode, which is the fundamental propagation mode, but also a number of higher-order propagation modes, such as the LP02 mode and the LP03 mode, are amplified in the core 21 of the second amplification optical fiber 20.

With the fiber laser system 1 having such a configuration, pumping light $P_1$ from the first pumping light sources 31 first enters the inner cladding layer 12 of the first amplification optical fiber 10. The pumping light $P_1$ excites Yb doped to the core 11. Thus, an LP01 mode, which is the fundamental propagation mode, is more intensely amplified based on the concentration distribution (FIG. 5) of Yb doped to the core 11 in the first amplification optical fiber 10. At that time, almost all of the pumping light $P_1$ is absorbed in the core 11 of the first amplification optical fiber 10. Therefore, the pumping light $P_1$ does not exert significant influence on the amplification in the second amplification optical fiber 20. In order to further reduce influence from the pumping light $P_1$ on the amplification in the second amplification optical fiber 20, as described above, the first amplification optical fiber 10 may preferably be long enough to ensure that at least 90% of the pumping light $P_1$ enters the inner cladding layer 12 of the first amplification optical fiber 10 from the first pumping light sources 31 is absorbed in the core 11 of the first amplification optical fiber 10.

Furthermore, the pumping light $P_2$ from the second pumping light sources 32 first enters the inner cladding layer 22 of the second amplification optical fiber 20. The pumping light $P_2$ excites Yb doped to the core 31. Higher-order propagation modes are more intensely amplified based on the concentration distribution (FIG. 6) of Yb doped to the core 21 in the second amplification optical fiber 20. At that time, almost all of the pumping light $P_2$ is absorbed in the core 21 of the second amplification optical fiber 20. Therefore, the pumping light $P_2$ does not exert significant influence on the amplification in the first amplification optical fiber 10. In order to further reduce influence from the pumping light $P_2$ on the amplification in the first amplification optical fiber 10, as described above, the second amplification optical fiber 20 may preferably be long enough to ensure that at least 90% of the pumping light $P_2$ enters the inner cladding layer 22 of the second amplification optical fiber 20 from the second pumping light sources 32 is absorbed in the core 21 of the second amplification optical fiber 20.

Thus, in the present embodiment, a propagation mode that is selectively amplified based on the active element doping concentration distribution of the core 11 in the first amplification optical fiber 10 can be controlled primarily by the pumping light $P_1$ from the first pumping light sources 31. A propagation mode that is selectively amplified based on the active element doping concentration distribution of the core 21 in the second amplification optical fiber 20 can be controlled primarily by the pumping light $P_2$ from the second pumping light sources 32. Therefore, a ratio of the intensity of the pumping light $P_1$ to the intensity of the pumping light $P_2$ can be changed by control of the first pumping light sources 31 and the second pumping light sources 32 (e.g., electric currents supplied to the first pumping light sources 31 and electric currents supplied to the second pumping light sources 32) with the controller 60, thereby adjusting a ratio of a propagation mode selectively amplified by the first amplification optical fiber 10 to a propagation mode selectively amplified by the second amplification optical fiber 20. Accordingly, a profile of a laser beam outputted from the optical cavity 2 can readily be adjusted into a desired shape. Thus, optical loss or degradation of beam quality can be reduced on a downstream side of the optical cavity 2 while no beam convertor for converting a beam profile into a desired shape is required on the downstream side of the optical cavity 2.

In the present embodiment, the active element doping concentration distribution of the first amplification optical fiber 10 and the active element distribution of the second amplification optical fiber 20 may be interchanged with each other. Furthermore, the active element doping concentration distribution of the core 11 in the first amplification optical fiber 10 and the active element doping concentration distribution of the core 21 in the second amplification optical fiber 20 are not limited to the illustrated examples. Any concentration distributions may be combined with each other and used depending on a required beam profile. For example, a distribution illustrated in FIG. 7 may be used as the active element distribution of the second amplification optical fiber 20. In the example shown in FIG. 7, while Yb is doped to the overall core 21 of the second amplification optical fiber 20, the concentration of Yb doped to a central area $R_4$ (for example, an area ranging from the center to a radius of 4 μm) of the core 21 is higher than the concentration of Yb doped to an area $R_5$ located radially outside of the central area $R_4$. With the second amplification optical fiber 20 having such an active element distribution, higher-order propagation modes are more intensely amplified. Therefore, when the second amplification optical fiber 20 having such an active element distribution is combined with the aforementioned first amplification optical fiber 10, a beam profile of a laser beam outputted from the optical cavity 2 can be controlled more flexibly.

Furthermore, as shown in FIG. 1, a pumping light removal portion 70 that removes at least one of the pumping light $P_1$ that has not been absorbed in the core 11 of the first amplification optical fiber 10 and the pumping light $P_2$ that has not been absorbed in the core 21 of the second amplification optical fiber 20 may be provided on the fusion splice portion 52 between the first amplification optical fiber 10 and the second amplification optical fiber 20. For example, a resin having a refractive index that is equal to or higher than a refractive index of at least one of the inner cladding layer 12 of the first amplification optical fiber 10 and the inner cladding layer 22 of the second amplification optical fiber 20 may be formed so as to cover at least one of the inner cladding layer 12 and the inner cladding layer 22, thereby forming the pumping light removal portion 70. In this case, pumping light $P_1$ that has not been absorbed in the core 11 of the first amplification optical fiber 10 and pumping light $P_2$ that has not been absorbed in the core 21 of the second amplification optical fiber 20 are allowed to leak out of the inner cladding layers 12 and 22 into the resin of the pumping light removal portion 70 and can thus be converted into heat, which can be then removed. Therefore, influence from the pumping light $P_1$ on the amplification in the second amplification optical fiber 20 can be reduced, and influence from the pumping light $P_2$ on the amplification in the first amplification optical fiber 10 can be reduced. Therefore, the power of the laser beam amplified in each of the first amplification optical fiber 10 and the second amplification optical fiber 20 is increased. As a result, the power of the outputted laser beam can be enhanced while the laser beam is adjusted to have a desired beam profile.

Figure 8:
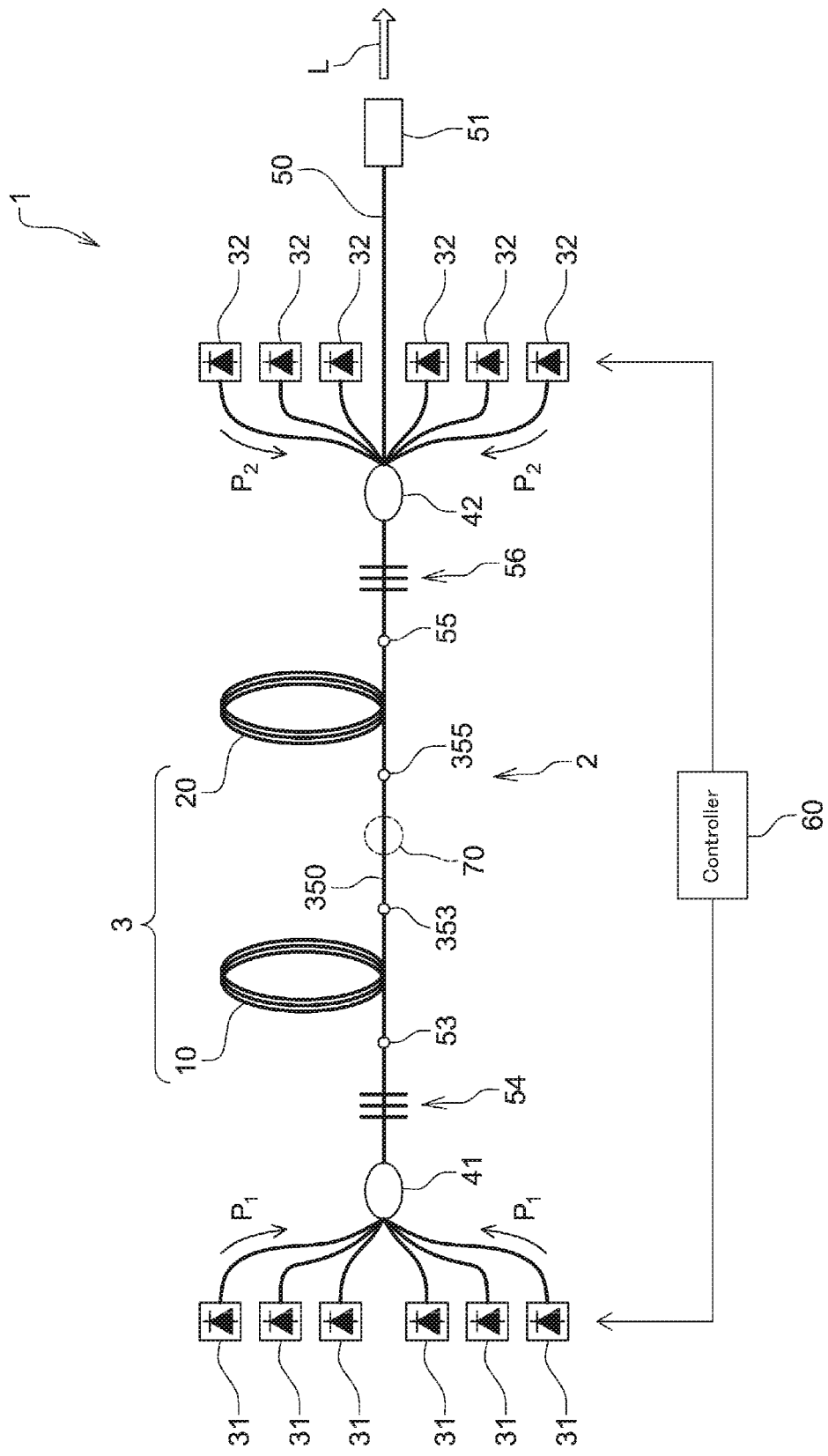
FIG. 8 is a diagram schematically showing a fiber laser system including an optical amplification apparatus according to another embodiment of the present invention.

In the example illustrated in FIG. 1, the first amplification optical fiber 10 and the second amplification optical fiber 20 are connected to each other at the fusion splice portion 52 by fusion splicing. As shown in FIG. 8, however, a relay optical fiber 350 having a core to which no active element has been doped may be used to interconnect the first amplification optical fiber 10 and the second amplification optical fiber 20. The core of the relay optical fiber 350 may preferably have a refractive index that is equal to the refractive index of the core 11 in the first amplification optical fiber 10 and the refractive index of the core 21 in the second amplification optical fiber 20. The inner cladding of the relay optical fiber 350 may preferably have a refractive index that is equal to the refractive index of the inner cladding layer 12 in the first amplification optical fiber 10 and the refractive index of the inner cladding layer 22 in the second amplification optical fiber 20.

In the example illustrated in FIG. 8, the relay optical fiber 350 is connected to the first amplification optical fiber 10 at a fusion splice portion 353 by fusion splicing and to the second amplification optical fiber 20 at a fusion splice portion 355 by fusion splicing. With this configuration, the aforementioned pumping light removal portion 70 may be provided in the middle of the relay optical fiber 350 as shown in FIG. 8. Alternatively, the pumping light removal portion 70 may be provided on an end of the first amplification optical fiber 10 near the second amplification optical fiber 20 (i.e., a fusion splice portion 353) or on an end of the second amplification optical fiber 20 near the first amplification optical fiber 10 (i.e., a fusion splice portion 355).

The fiber laser system 1 of the above embodiments includes a plurality of first pumping light sources 31. Nevertheless, the fiber laser system 1 may include one first pumping light source 31. In this case, the upstream optical combiner 41 may or may not be provided. Similarly, the fiber laser system 1 of the above embodiments includes a plurality of second pumping light sources 32. Nevertheless, the fiber laser system 1 may include one second pumping light source 32. In this case, the downstream optical combiner 42 may or may not be provided.

In the above embodiments, the first amplification optical fiber 10 is disposed on an upstream side of the system, and the second amplification optical fiber 20 is disposed on a downstream side of the system. As a matter of course, the second amplification optical fiber 20 may be disposed on an upstream side of the system, and the first amplification optical fiber 10 may be disposed on a downstream side of the system.

Figure 9:
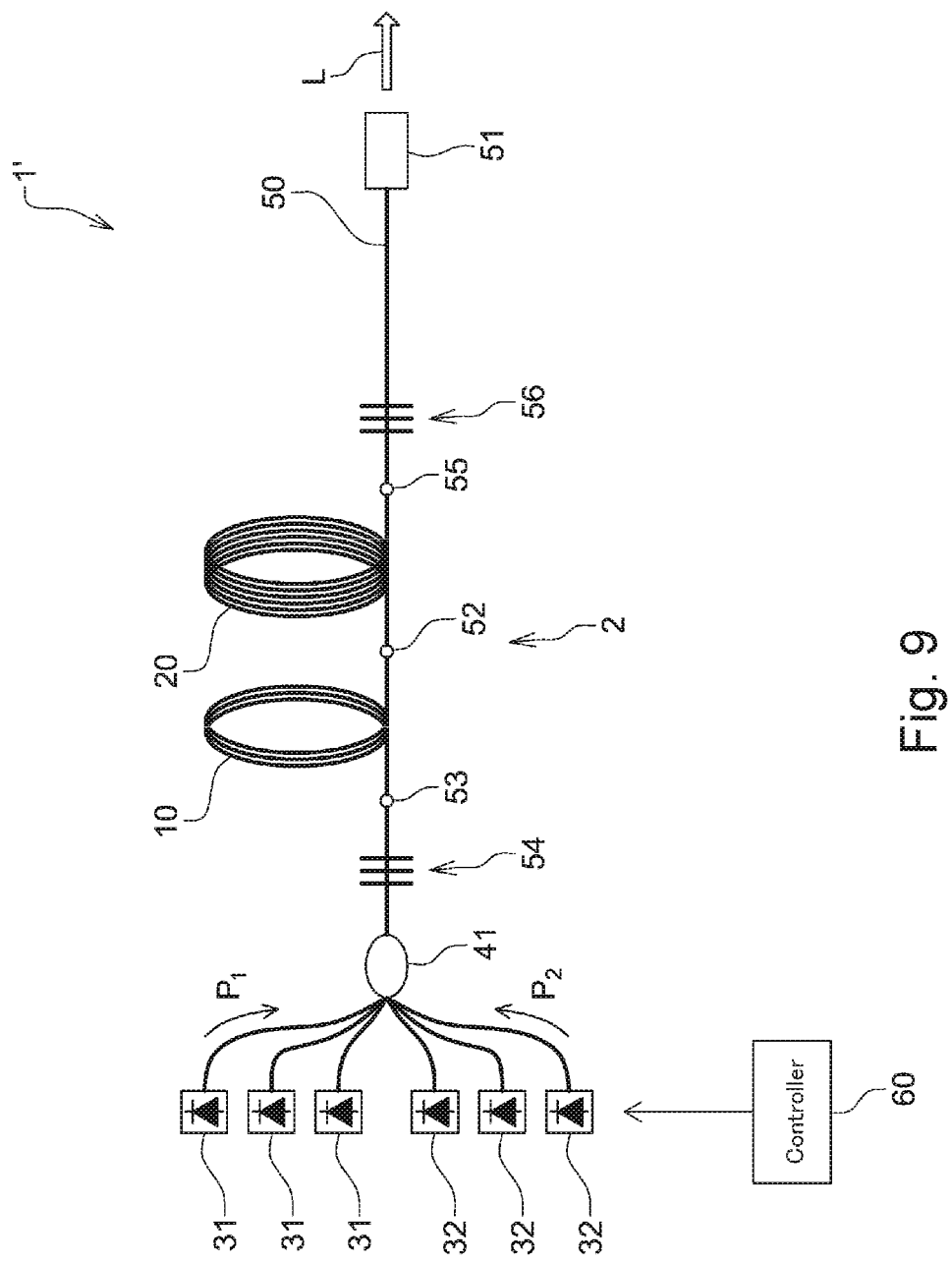
FIG. 9 is a diagram schematically showing a fiber laser system including an optical amplification apparatus according to a second embodiment of the present invention.

FIG. 9 is a diagram schematically showing a fiber laser system 1' including an optical amplification apparatus according to a second embodiment of the present invention. As shown in FIG. 9, the fiber laser system 1' of this embodiment has an optical cavity 2, a plurality of first pumping light sources 31 operable to allow a first pumping light beam $P_1$ to enter the optical cavity 2 from an upstream side of the optical cavity 2, a plurality of second pumping light sources 32 operable to allow a second pumping light beam $P_2$ to enter the optical cavity 2 from the upstream side of the optical cavity 2, an upstream optical combiner 41 operable to combine the pumping light beams $P_1$ and $P_2$ from those pumping light sources 31 and 32 and output the combined pumping light beams to the optical cavity 2, a delivery fiber 50 extending from the optical cavity 2, a laser emission portion 51 provided on a downstream end of the delivery fiber 50, and a controller 60 operable to control the first pumping light sources 31 and the second pumping light sources 32 (e.g., electric currents supplied to the first pumping light sources 31 and the second pumping light sources 32).

The optical cavity 2 includes a first amplification optical fiber 10 located on an upstream side of the system and a second amplification optical fiber 20 connected to a downstream side of the first amplification optical fiber 10 in a longitudinal direction of the first amplification optical fiber 10. The first amplification optical fiber 10 and the second amplification optical fiber 20 are connected to each other at a fusion splice portion 52 by fusion splicing.

In the aforementioned first embodiment, the second pumping light sources 32 are provided on a downstream side of the second amplification optical fiber 20. In the present embodiment, however, the second pumping light sources 32 are provided on an upstream side of the first amplification optical fiber 10, as with the first pumping light sources 31. Therefore, no downstream optical combiner 42 is provided in this embodiment.

For example, each of the first pumping light sources 31 of this embodiment generates pumping light $P_1$ (first pumping light) having a center wavelength of 976 nm, and each of the second pumping light sources 32 generates pumping light $P_2$ (second pumping light) having a center wavelength of 915 nm.

Figure 10:
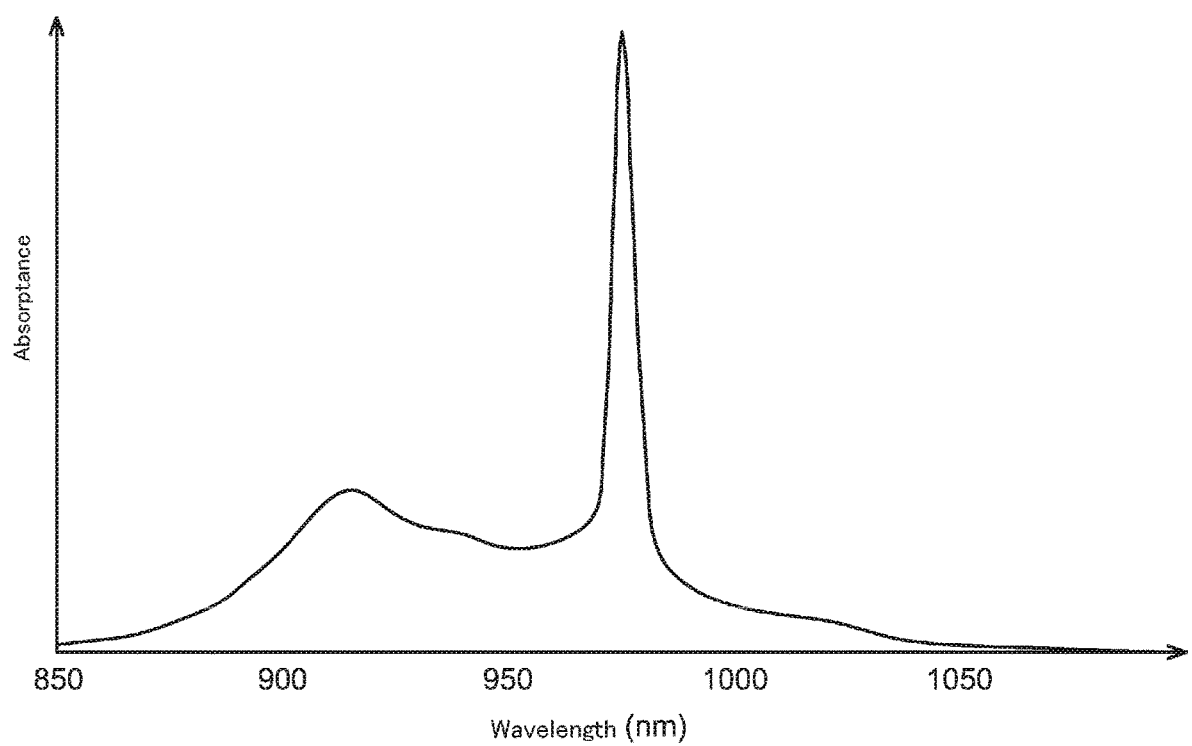
FIG. 10 is a diagram showing an absorption spectrum of a Yb-doped fiber.

As shown in FIG. 10, an absorption spectrum of an optical fiber to which Yb has been doped has peaks at two wavelengths of 976 nm and 915 nm. Pumping light having a wavelength of 976 nm has an absorptance three times that of pumping light having a wavelength of 915 nm. In the present embodiment, therefore, pumping light $P_1$ having a wavelength of 976 nm, which is outputted from the first pumping light sources 31, is more likely to be absorbed in the cores 11 and 21 of the amplification optical fibers 10 and 20 than pumping light $P_2$ having a wavelength of 915 nm, which is outputted from the second pumping light sources 32. The present embodiment describes an example in which the pumping light $P_1$ generated by the first pumping light sources 31 has a wavelength of 976 nm, and the pumping light $P_2$ generated by the second pumping light sources 32 has a wavelength of 915 nm. Nevertheless, the wavelength of the pumping light $P_1$ and the wavelength of the pumping light $P_2$ are not limited to those values.

The upstream optical combiner 41 is configured to combine the pumping light beams $P_1$ and $P_2$ outputted from the pumping light sources 31 and 32 and allow the combined pumping light beams to enter the inner cladding layer 12 of the first amplification optical fiber 10. Specifically, the pumping light beams $P_1$ and $P_2$ enter the inner cladding layer 12 of the first amplification optical fiber 10 from an opposite side of the first amplification optical fiber 10 to the second amplification optical fiber 20.

In the optical cavity 2, when the pumping light propagating through the inner cladding layer 12 of the first amplification optical fiber 10 and the inner cladding layer 22 of the second amplification optical fiber 20 passes through the core 11 of the first amplification optical fiber 10 and the core 21 of the second amplification optical fiber 20, it is absorbed in Yb so that Yb is excited to produce spontaneous emission. The spontaneous emission produced by excitation of Yb is recursively reflected between the high-reflectivity FBG portion 54 and the low-reflectivity FBG portion 56, so that light having a specific wavelength (e.g., 1064 nm) is amplified to cause laser oscillation. The laser beam L amplified by the optical cavity 2 propagates through the core 11 of the first amplification optical fiber 10 and the core 21 of the second amplification optical fiber 20. A portion of the laser beam L transmits through the low-reflectivity FBG portion 56 and propagates downstream. The laser beam L that has transmitted through the low-reflectivity FBG portion 56 propagates through the delivery fiber 50. Then laser beam L is emitted from the laser emission portion 51 toward, for example, a workpiece. Thus, in the present embodiment, the first pumping light sources 31, the second pumping light sources 32, the upstream optical combiner 41, the optical cavity 2, and the controller 60 form an optical amplification apparatus that amplifies a laser beam and output the amplified laser beam.

With the fiber laser system 1' having such a configuration, the pumping light $P_1$ from the first pumping light sources 31 and the pumping light $P_2$ from the second pumping light sources 32 first enter the inner cladding layer 12 of the first amplification optical fiber 10. The pumping light $P_1$ and $P_2$ excites Yb doped to the core 11. Thus, an LP01 mode, which is the fundamental propagation mode, is more intensely amplified based on the concentration distribution (FIG. 5) of Yb doped to the core 11 in the first amplification optical fiber 10. Furthermore, pumping light that has not been absorbed in the core 11 of the first amplification optical fiber 10 propagates through the inner cladding layer 22 of the second amplification optical fiber 20 and excites Yb doped to the core 21. Thus, higher-order propagation modes are more intensely amplified based on the concentration distribution (FIG. 6) of Yb doped to the core 21 in the second amplification optical fiber 20.

As described above, pumping light $P_1$ having a wavelength of 976 nm is more likely to be absorbed in the core 11 than pumping light $P_2$ having a wavelength of 915 nm. Therefore, almost all of the pumping light $P_1$ is absorbed in the core 11 of the first amplification optical fiber 10. Accordingly, the pumping light $P_1$ does not exert significant influence on the amplification in the second amplification optical fiber 20. In contrast, most of the pumping light $P_2$ transmits through the first amplification optical fiber 10 without being absorbed in the core 11 of the first amplification optical fiber 10. The pumping light $P_2$ that has not been absorbed enters the inner cladding layer 22 of the second amplification optical fiber 20 and excites Yb doped to the core 21 while it propagates through the inner cladding layer 22. Therefore, the pumping light $P_2$ does not exert significant influence on the amplification in the first amplification optical fiber 10. In order to further reduce influence from the pumping light $P_1$ on the amplification in the first amplification optical fiber 10 and further increase influence from the pumping light $P_2$ on the amplification in the second amplification optical fiber 20, the first amplification optical fiber 10 may preferably have such a length that less than 50% of the pumping light $P_2$ is absorbed in the core 11. Furthermore, in order to sufficiently absorb the pumping light $P_2$ having a wavelength of 915 nm with a low absorptance in the core 21, the second amplification optical fiber 20 may preferably be longer than the first amplification optical fiber 10. For example, the first amplification optical fiber 10 may preferably have a length of at least 5 m, and the second amplification optical fiber 20 may preferably have a length of at least 10 m.

Thus, in the present embodiment, a propagation mode that is selectively amplified based on the active element doping concentration distribution of the core 11 in the first amplification optical fiber 10 can be controlled primarily by the pumping light $P_1$ having a wavelength of 976 nm from the first pumping light sources 31. A propagation mode that is selectively amplified based on the active element doping concentration distribution of the core 21 in the second amplification optical fiber 20 can be controlled primarily by the pumping light $P_2$ having a wavelength of 915 nm from the second pumping light sources 32.

Therefore, a ratio of the intensity of the pumping light $P_1$ to the intensity of the pumping light $P_2$ can be changed by control of the first pumping light sources 31 and the second pumping light sources 32 (e.g., electric currents supplied to the first pumping light sources 31 and electric currents supplied to the second pumping light sources 32) with the controller 60, thereby adjusting a ratio of a propagation mode selectively amplified by the first amplification optical fiber 10 to a propagation mode selectively amplified by the second amplification optical fiber 20. Accordingly, a profile of a laser beam outputted from the optical cavity 2 can readily be adjusted into a desired shape. Thus, optical loss or degradation of beam quality can be reduced on a downstream side of the optical cavity 2 while no beam convertor for converting a beam profile into a desired shape is required on the downstream side of the optical cavity 2.

In the present embodiment, the active element doping concentration distribution of the first amplification optical fiber 10 and the active element distribution of the second amplification optical fiber 20 may be interchanged with each other. Furthermore, the active element doping concentration distribution of the core 11 in the first amplification optical fiber 10 and the active element doping concentration distribution of the core 21 in the second amplification optical fiber 20 are not limited to the illustrated examples. Any concentration distributions may be combined with each other and used depending on a required beam profile. For example, a distribution illustrated in FIG. 7 may be used as the active element distribution of the second amplification optical fiber 20. In the example shown in FIG. 7, while Yb is doped to the overall core 21 of the second amplification optical fiber 20, the concentration of Yb doped to a central area $R_4$ (for example, an area ranging from the center to a radius of 4 μm) of the core 21 is higher than the concentration of Yb doped to an area $R_5$ located radially outside of the central area $R_4$. With the second amplification optical fiber 20 having such an active element distribution, higher-order propagation modes are more intensely amplified. Therefore, when the second amplification optical fiber 20 having such an active element distribution is combined with the aforementioned first amplification optical fiber 10, a beam profile of a laser beam outputted from the optical cavity 2 can be controlled more flexibly.

Figure 11:
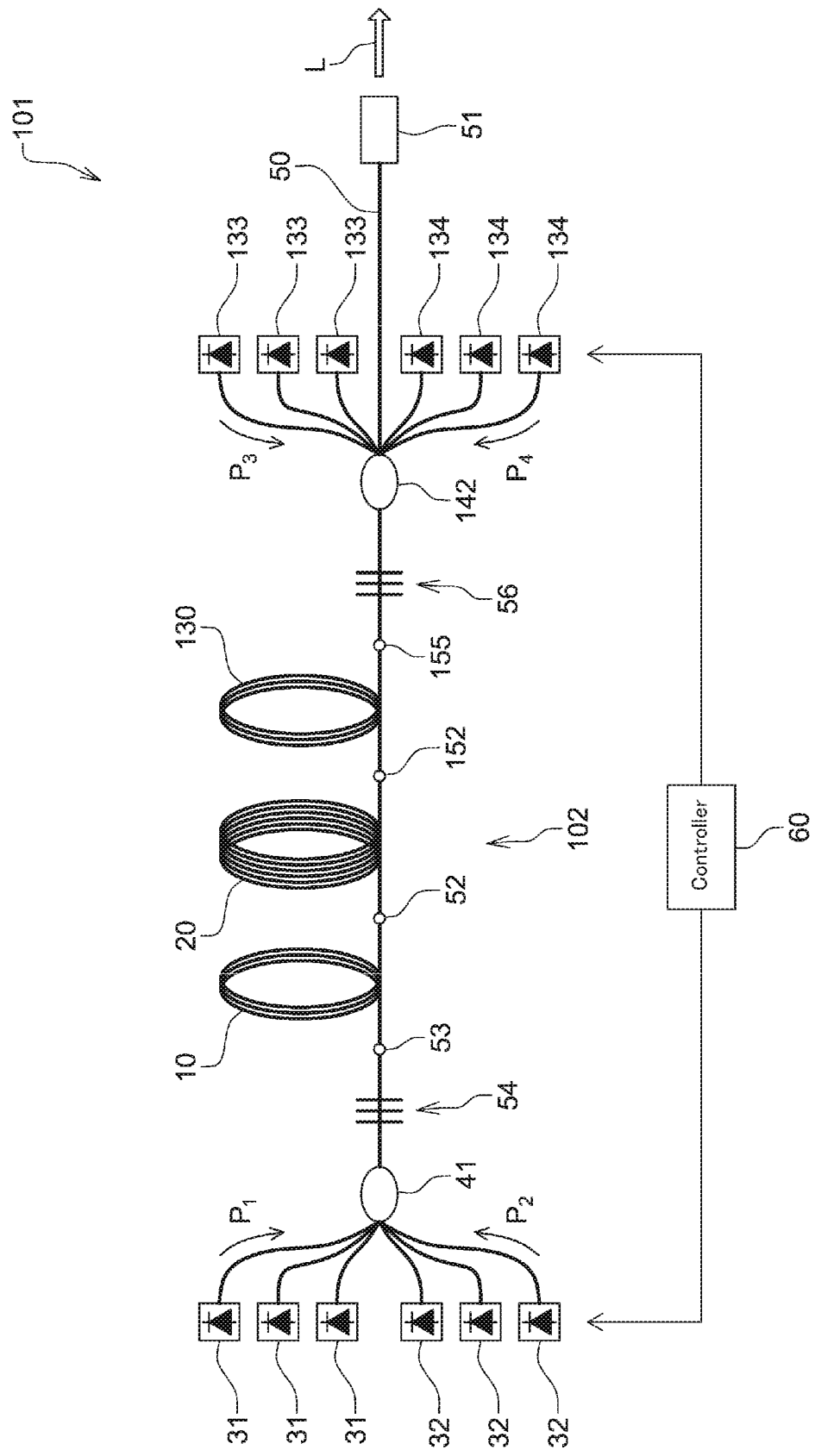
FIG. 11 is a diagram schematically showing a fiber laser system including an optical amplification apparatus according to a third embodiment of the present invention.

FIG. 11 is a diagram schematically showing a fiber laser system 101 including an optical amplification apparatus according to a third embodiment of the present invention. As shown in FIG. 11, the fiber laser system 101 of this embodiment has a third amplification optical fiber 130 in addition to the first amplification optical fiber 10 and the second amplification optical fiber 20 of the first embodiment. The third amplification optical fiber 130 is connected to the second amplification optical fiber 20 on an opposite side to the first amplification optical fiber 10 in a longitudinal direction of the second amplification optical fiber 20. The third amplification optical fiber 130 is connected to the second amplification optical fiber 20 at a fusion splice portion 152 by fusion splicing. In the present embodiment, the low-reflectivity FBG portion 56 is connected to the third amplification optical fiber 130 at a fusion splice portion 155 by fusion splicing. Thus, in the present embodiment, an optical cavity 102 is formed by the high-reflectivity FBG portion 54, the first amplification optical fiber 10, the second amplification optical fiber 20, the third amplification optical fiber 130, and the low-reflectivity FBG portion 56.

Figure 12:
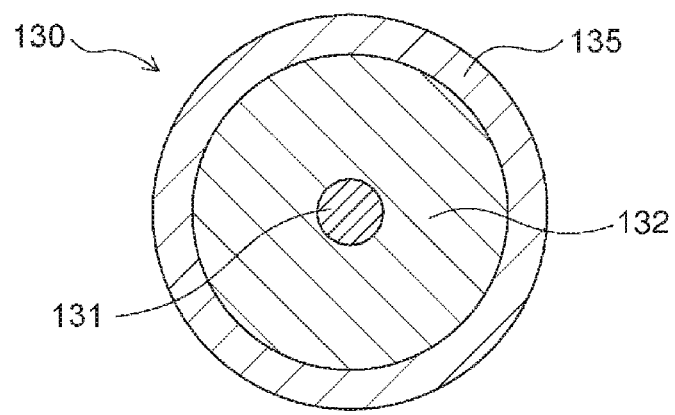
FIG. 12 is a cross-sectional view schematically showing a structure of a third amplification optical fiber in the fiber laser system illustrated in FIG. 11.

FIG. 12 is a cross-sectional view schematically showing a structure of the third amplification optical fiber 130. As shown in FIG. 12, the third amplification optical fiber 130 has a core 131 (third core), an inner cladding layer 132 (third cladding layer) that surrounds an outer circumference of the core 131, and an outer cladding layer 135 that surrounds an outer circumference of the inner cladding layer 132.

For example, the core 131 is formed by doping an element for increasing a refractive index, such as aluminum, to silica glass and further doping an active element to at least a portion of the silica glass. For example, the inner cladding layer 132 is formed of silica glass without any dopant being doped thereto. The inner cladding layer 132 has a refractive index lower than a refractive index of the core 131. Thus, an optical waveguide is formed within the core 131. For example, a relative refractive index difference between the core 131 and the inner cladding layer 132 is 0.32%. For example, the outer cladding layer 135 is formed of an ultraviolet curable resin. The outer cladding layer 135 has a refractive index lower than the refractive index of the inner cladding layer 132. Thus, an optical waveguide is also formed within the inner cladding layer 132. For example, the core 131 has a diameter of 30 μm, the inner cladding layer 132 has an outside diameter of 420 μm, and the outer cladding layer 135 has an outside diameter of 440 μm.

Examples of the active element doped to the core 131 include rare earth elements such as ytterbium (Yb), erbium (Er), thulium (Tm), and neodymium (Nd), bismuth (Bi), and chromium (Cr). The present embodiment describes an example in which Yb is doped to the core 131 of the third amplification optical fiber 130. Nevertheless, the present invention is not limited to this example. The active element doped to the core 131 of the third amplification optical fiber 130 may preferably be the same as the active elements doped to the core 11 of the first amplification optical fiber 10 and the core 21 of the second amplification optical fiber 20.

While Yb is doped to the overall core 131 of the third amplification optical fiber 130, a radial concentration distribution of Yb doped to the core 131 (third active element doping concentration distribution) is different from the concentration distribution of Yb doped to the core 21 of the second amplification optical fiber 20 (second active element doping concentration distribution). Thus, a propagation mode of light selectively amplified in the third amplification optical fiber 130 is different from a propagation mode of light selectively amplified in the second amplification optical fiber 20. For example, the doping concentration distribution of Yb doped to the core 131 of the third amplification optical fiber 130 may be as illustrated in FIG. 5 (the same distribution as the doping concentration distribution of Yb doped to the core 11 of the first amplification optical fiber 10).

In order to reduce optical loss at the fusion splice portion 152, the core 21 of the second amplification optical fiber 20 and the core 131 of the third amplification optical fiber 130 may preferably have the same outside diameter. Similarly, the inner cladding layer 22 of the second amplification optical fiber 20 and the inner cladding layer 132 of the third amplification optical fiber 130 may preferably have the same outside diameter.

The fiber laser system 101 of this embodiment is a bidirectional pumping fiber laser and includes a plurality of third pumping light sources 133 operable to allow a third pumping light beam $P_3$ to enter the optical cavity 102 from a downstream side of the optical cavity 2 and a plurality of fourth pumping light sources 134 operable to allow a fourth pumping light beam $P_4$ to enter the optical cavity 102 from the downstream side of the optical cavity 102, in addition to the aforementioned first pumping light sources 31 and second pumping light sources 32. The fiber laser system 101 also includes a downstream optical combiner 142 operable to combine the pumping light beams $P_3$ and $P_4$ from those pumping light sources 133 and 134 and output the combined pumping light beams to the optical cavity 102. The delivery fiber 50 of this embodiment is connected to the downstream optical combiner 142. For example, the controller 60 of this embodiment is configured to control electric currents supplied to the first pumping light sources 31, the second pumping light sources 32, the third pumping light sources 133, and the fourth pumping light sources 134.

Each of the third pumping light sources 133 includes, for example, a Fabry-Perot semiconductor laser device formed of a GaAs-based semiconductor material and, for example, generates pumping light $P_3$ (third pumping light) having a center wavelength of 976 nm. Similarly, each of the fourth pumping light sources 134 includes, for example, a Fabry-Perot semiconductor laser device formed of a GaAs-based semiconductor material and, for example, generates pumping light $P_4$ (fourth pumping light) having a center wavelength of 915 nm. As shown in FIG. 10, pumping light $P_3$ having a wavelength of 976 nm, which is outputted from the third pumping light sources 133, is more likely to be absorbed in the cores 11, 21, and 131 of the amplification optical fibers 10, 20, and 130 than pumping light $P_4$ having a wavelength of 915 nm, which is outputted from the fourth pumping light sources 134.

The downstream optical combiner 142 is configured to combine the pumping light beams $P_3$ and $P_4$ outputted from the pumping light sources 133 and 134 and allow the combined pumping light beams to enter the inner cladding layer 132 of the third amplification optical fiber 130. Specifically, the pumping light beams $P_3$ and $P_4$ enter the inner cladding layer 132 of the third amplification optical fiber 130 from an opposite side of the third amplification optical fiber 130 to the second amplification optical fiber 20.

In the present embodiment, the first pumping light sources 31, the second pumping light sources 32, the upstream optical combiner 41, the optical cavity 102, the downstream optical combiner 142, the third pumping light sources 133, the fourth pumping light sources 134, and the controller 60 form an optical amplification apparatus that amplifies a laser beam and output the amplified laser beam.

With the fiber laser system 101 having such a configuration, the pumping light $P_1$ from the first pumping light sources 31 and the pumping light $P_2$ from the second pumping light sources 32 first enter the inner cladding layer 12 of the first amplification optical fiber 10. The pumping light $P_1$ and the pumping light $P_2$ excite Yb doped to the core 11 in the first amplification optical fiber 10. Thus, a certain propagation mode (e.g., the fundamental propagation mode) is selectively amplified based on the concentration distribution of Yb doped to the core 11. At that time, almost all of the pumping light $P_1$ having a wavelength of 976 nm, which has a high absorptance, is absorbed in the core 11 of the first amplification optical fiber 10. Most of the pumping light $P_2$ having a wavelength of 915 nm, which has a low absorptance, is not absorbed in the core 11 of the first amplification optical fiber 10.

Furthermore, the pumping light $P_3$ from the third pumping light sources 133 and the pumping light $P_4$ from the fourth pumping light sources 134 first enter the inner cladding layer 132 of the third amplification optical fiber 130. The pumping light $P_3$ and the pumping light $P_4$ excite Yb doped to the core 131. Thus, a certain propagation mode (e.g., the fundamental propagation mode) is selectively amplified based on the concentration distribution of Yb doped to the core 131 in the third amplification optical fiber 130. At that time, almost all of the pumping light $P_3$ having a wavelength of 976 nm, which has a high absorptance, is absorbed in the core 131 of the third amplification optical fiber 130. Most of the pumping light beam $P_4$ having a wavelength of 915 nm, which has a low absorptance, is not absorbed in the core 131 of the third amplification optical fiber 130.

Pumping light that has not been absorbed in the core 11 of the first amplification optical fiber 10 propagates through the inner cladding layer 22 of the second amplification optical fiber 20 and excites Yb doped to the core 21. Pumping light that has not been absorbed in the core 131 of the third amplification optical fiber 130 propagates through the inner cladding layer 22 of the second amplification optical fiber 20 and excites Yb doped to the core 21. As described above, almost all of the pumping light $P_1$ is absorbed in the core 11 of the first amplification optical fiber 10, and almost all of the pumping light $P_3$ is absorbed in the core 131 of the third amplification optical fiber 130. Therefore, pumping light that is to enter the second amplification optical fiber 20 primarily includes the pumping light $P_2$ and the pumping light $P_4$. Thus, a certain propagation mode (e.g., higher-order propagation modes) is more intensely amplified based on the concentration distribution of Yb doped to the core 21 of the second amplification optical fiber 20.

Thus, in the present embodiment, a propagation mode that is selectively amplified based on the active element doping concentration distribution of the core 11 in the first amplification optical fiber 10 can be controlled primarily by the pumping light $P_1$ from the first pumping light sources 31. A propagation mode that is selectively amplified based on the active element doping concentration distribution of the core 21 in the second amplification optical fiber 20 can be controlled primarily by the pumping light $P_2$ from the second pumping light sources 32 and the pumping light $P_4$ from the fourth pumping light sources 134. A propagation mode that is selectively amplified based on the active element doping concentration distribution of the core 131 in the third amplification optical fiber 130 can be controlled primarily by the pumping light $P_3$ from the third pumping light sources 133.

Therefore, a ratio of the intensity of the pumping light $P_1$, the intensity of the pumping light $P_2$, the intensity of the pumping light $P_3$, and the intensity of the pumping light $P_4$ can be changed by control of the first pumping light sources 31, the second pumping light sources 32, the third pumping light sources 33, and the fourth pumping light sources 34 (e.g., electric currents supplied to the first pumping light sources 31, electric currents supplied to the second pumping light sources 32, electric currents supplied to the third pumping light sources 133, and electric currents supplied to the fourth pumping light sources 134) with the controller 60, thereby adjusting a ratio of a propagation mode selectively amplified by the first amplification optical fiber 10, a propagation mode selectively amplified by the second amplification optical fiber 20, and a propagation mode selectively amplified by the third amplification optical fiber 130. Accordingly, a profile of a laser beam outputted from the optical cavity 102 can readily be adjusted into a desired shape. Thus, optical loss or degradation of beam quality can be reduced on a downstream side of the optical cavity 102 while no beam convertor for converting a beam profile into a desired shape is required on the downstream side of the optical cavity 102.

In the present embodiment, the fourth pumping light sources 134 may be omitted. In such a case, a propagation mode that is selectively amplified by the second amplification optical fiber 20 can be controlled primarily by the pumping light $P_2$ from the second pumping light sources 32 only.

Figure 13:
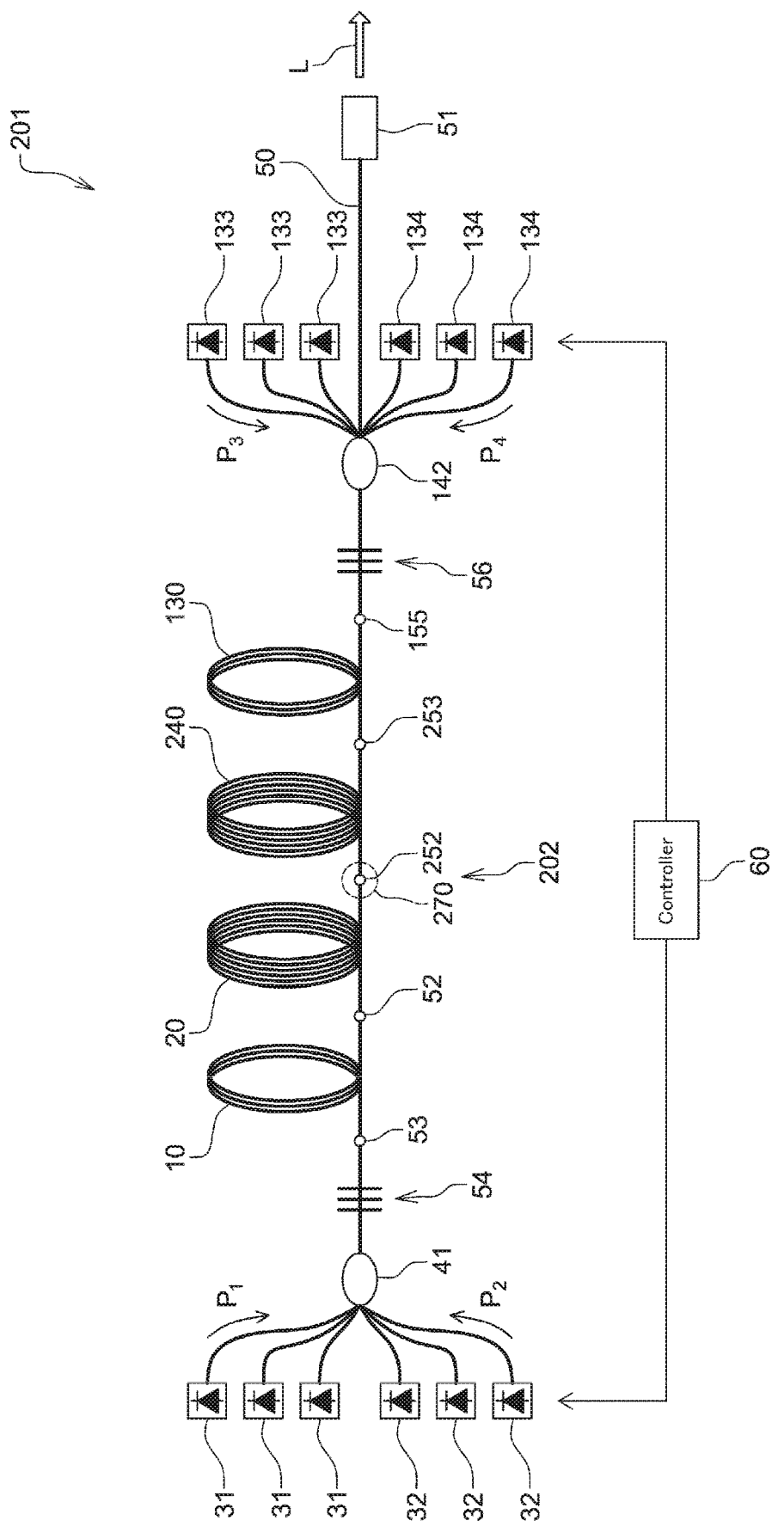
FIG. 13 is a diagram schematically showing a fiber laser system including an optical amplification apparatus according to a fourth embodiment of the present invention.

FIG. 13 is a diagram schematically showing a fiber laser system 201 including an optical amplification apparatus according to a fourth embodiment of the present invention. As shown in FIG. 13, the fiber laser system 201 of this embodiment has a fourth amplification optical fiber 240 in addition to the first amplification optical fiber 10, the second amplification optical fiber 20, and the third amplification optical fiber 130 of the third embodiment. The fourth amplification optical fiber 240 is connected between the second amplification optical fiber 20 and the third amplification optical fiber 130 in a longitudinal direction of the second amplification optical fiber 20 and the third amplification optical fiber 130. The fourth amplification optical fiber 240 is connected to the second amplification optical fiber 20 at a fusion splice portion 252 by fusion splicing and to the third amplification optical fiber 130 at a fusion splice portion 253 by fusion splicing. Thus, in the present embodiment, an optical cavity 202 is formed by the high-reflectivity FBG portion 54, the first amplification optical fiber 10, the second amplification optical fiber 20, the third amplification optical fiber 130, the fourth amplification optical fiber 240, and the low-reflectivity FBG portion 56.

Figure 14:
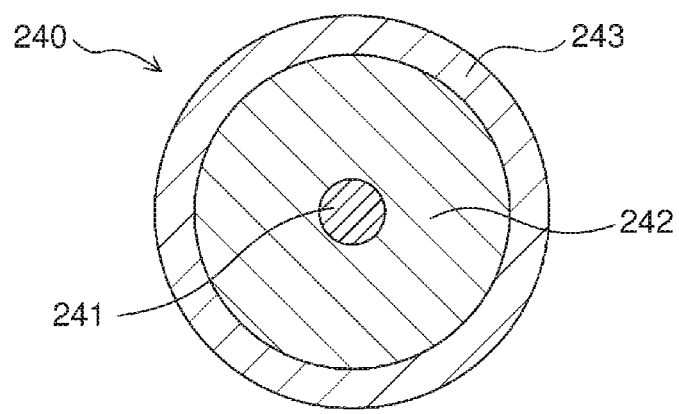
FIG. 14 is a cross-sectional view schematically showing a structure of a fourth amplification optical fiber in the fiber laser system illustrated in FIG. 13.

FIG. 14 is a cross-sectional view schematically showing a structure of the fourth amplification optical fiber 240. As shown in FIG. 14, the fourth amplification optical fiber 240 has a core 241 (fourth core), an inner cladding layer 242 (fourth cladding layer) that surrounds an outer circumference of the core 241, and an outer cladding layer 243 that surrounds an outer circumference of the inner cladding layer 242.

For example, the core 241 is formed by doping an element for increasing a refractive index, such as aluminum, to silica glass and further doping an active element to at least a portion of the silica glass. For example, the inner cladding layer 242 is formed of silica glass without any dopant being doped thereto. The inner cladding layer 242 has a refractive index lower than a refractive index of the core 241. Thus, an optical waveguide is formed within the core 241. For example, a relative refractive index difference between the core 241 and the inner cladding layer 242 is 0.32%. For example, the outer cladding layer 243 is formed of an ultraviolet curable resin. The outer cladding layer 243 has a refractive index lower than the refractive index of the inner cladding layer 242. Thus, an optical waveguide is also formed within the inner cladding layer 242. For example, the core 241 has a diameter of 30 μm, the inner cladding layer 242 has an outside diameter of 420 μm, and the outer cladding layer 243 has an outside diameter of 440 μm.

Examples of the active element doped to the core 241 include rare earth elements such as ytterbium (Yb), erbium (Er), thulium (Tm), and neodymium (Nd), bismuth (Bi), and chromium (Cr). The present embodiment describes an example in which Yb is doped to the core 241 of the fourth amplification optical fiber 240. Nevertheless, the present invention is not limited to this example. The active element doped to the core 241 of the fourth amplification optical fiber 240 may preferably be the same as the active elements doped to the core 11 of the first amplification optical fiber 10, the core 21 of the second amplification optical fiber 20, and the core 131 of the third amplification optical fiber 130.

Figure 7:
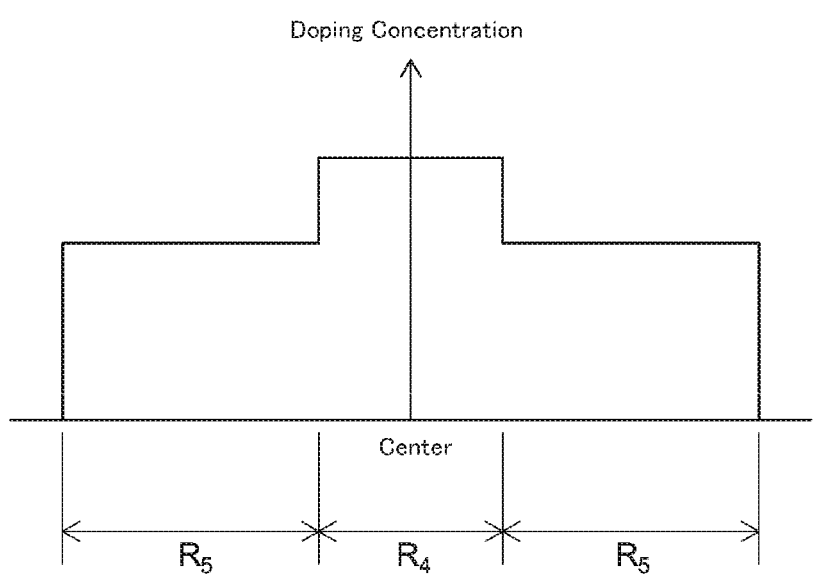
FIG. 7 is a diagram showing another example of a radial concentration distribution of Yb doped to the core of the second amplification optical fiber illustrated in FIG. 3.

While Yb is doped to the overall core 241 of the fourth amplification optical fiber 240, a radial concentration distribution of Yb doped to the core 241 (fourth active element doping concentration distribution) is different from the concentration distribution of Yb doped to the core 131 of the third amplification optical fiber 130 (third active element doping concentration distribution). Thus, a propagation mode of light selectively amplified in the fourth amplification optical fiber 240 is different from a propagation mode of light selectively amplified in the third amplification optical fiber 130. For example, the doping concentration distribution of Yb doped to the core 241 of the fourth amplification optical fiber 240 may be as illustrated in FIG. 6 or 7 (the same distribution as the doping concentration distribution of Yb doped to the core 21 of the second amplification optical fiber 20).

In order to reduce optical loss at the fusion splice portion 252, the core 241 of the fourth amplification optical fiber 240 and the core 21 of the second amplification optical fiber 20 may preferably have the same outside diameter. Furthermore, the inner cladding layer 242 of the fourth amplification optical fiber 240 and the inner cladding layer 22 of the second amplification optical fiber 20 may preferably have the same outside diameter. Moreover, in order to reduce optical loss at the fusion splice portion 253, the core 241 of the fourth amplification optical fiber 240 and the core 131 of the third amplification optical fiber 130 may preferably have the same outside diameter. Furthermore, the inner cladding layer 242 of the fourth amplification optical fiber 240 and the inner cladding layer 132 of the third amplification optical fiber 130 may preferably have the same outside diameter.

With the fiber laser system 201 having such a configuration, the pumping light $P_1$ from the first pumping light sources 31 and the pumping light $P_2$ from the second pumping light sources 32 first enter the inner cladding layer 12 of the first amplification optical fiber 10. The pumping light $P_1$ and the pumping light $P_2$ excite Yb doped to the core 11 in the first amplification optical fiber 10. Thus, a certain propagation mode (e.g., the fundamental propagation mode) is selectively amplified based on the concentration distribution of Yb doped to the core 11. At that time, almost all of the pumping light $P_1$ having a wavelength of 976 nm, which has a high absorptance, is absorbed in the core 11 of the first amplification optical fiber 10. Most of the pumping light $P_2$ having a wavelength of 915 nm, which has a low absorptance, is not absorbed in the core 11 of the first amplification optical fiber 10.

Furthermore, the pumping light beams $P_3$ from the third pumping light sources 133 and the pumping light beams $P_4$ from the fourth pumping light sources 134 first enter the inner cladding layer 132 of the third amplification optical fiber 130. The pumping light $P_3$ and the pumping light $P_4$ excite Yb doped to the core 131. Thus, a certain propagation mode (e.g., the fundamental propagation mode) is selectively amplified based on the concentration distribution of Yb doped to the core 131 in the third amplification optical fiber 130. At that time, almost all of the pumping light $P_3$ having a wavelength of 976 nm, which has a high absorptance, is absorbed in the core 131 of the third amplification optical fiber 130. Most of the pumping light beam $P_4$ having a wavelength of 915 nm, which has a low absorptance, is not absorbed in the core 131 of the third amplification optical fiber 130.

Pumping light that has not been absorbed in the core 11 of the first amplification optical fiber 10 propagates through the inner cladding layer 22 of the second amplification optical fiber 20 and excites Yb doped to the core 21. As described above, almost all of the pumping light $P_1$ is absorbed in the core 11 of the first amplification optical fiber 10. Therefore, pumping light that is to enter the second amplification optical fiber 20 primarily includes the pumping light $P_2$. Thus, a certain propagation mode (e.g., higher-order propagation modes) is more intensely amplified based on the concentration distribution of Yb doped to the core 21 of the second amplification optical fiber 20.

Furthermore, pumping light that has not been absorbed in the core 131 of the third amplification optical fiber 130 propagates through the inner cladding layer 242 of the fourth amplification optical fiber 240 and excites Yb doped to the core 241. As described above, almost all of the pumping light $P_3$ is absorbed in the core 131 of the third amplification optical fiber 130. Therefore, pumping light that is to enter the fourth amplification optical fiber 240 primarily includes the pumping light $P_4$. Thus, a certain propagation mode (e.g., higher-order propagation modes) is more intensely amplified based on the concentration distribution of Yb doped to the core 241 of the fourth amplification optical fiber 240.

Thus, in the present embodiment, a propagation mode that is selectively amplified based on the active element doping concentration distribution of the core 11 in the first amplification optical fiber 10 can be controlled primarily by the pumping light $P_1$ from the first pumping light sources 31. A propagation mode that is selectively amplified based on the active element doping concentration distribution of the core 21 in the second amplification optical fiber 20 can be controlled primarily by the pumping light $P_2$ from the second pumping light sources 32. A propagation mode that is selectively amplified based on the active element doping concentration distribution of the core 131 in the third amplification optical fiber 130 can be controlled primarily by the pumping light $P_3$ from the third pumping light sources 133. A propagation mode that is selectively amplified based on the active element doping concentration distribution of the core 241 in the fourth amplification optical fiber 240 can be controlled primarily by the pumping light $P_4$ from the fourth pumping light sources 134.

Therefore, a ratio of the intensity of the pumping light $P_1$, the intensity of the pumping light $P_2$, the intensity of the pumping light $P_3$, and the intensity of the pumping light $P_4$ can be changed by control of the first pumping light sources 31, the second pumping light sources 32, the third pumping light sources 33, and the fourth pumping light sources 34 (e.g., electric currents supplied to the first pumping light sources 31, electric currents supplied to the second pumping light sources 32, electric currents supplied to the third pumping light sources 133, and electric currents supplied to the fourth pumping light sources 134) with the controller 60, thereby adjusting a ratio of a propagation mode selectively amplified by the first amplification optical fiber 10, a propagation mode selectively amplified by the second amplification optical fiber 20, a propagation mode selectively amplified by the third amplification optical fiber 130, and a propagation mode selectively amplified by the fourth amplification optical fiber 240. Accordingly, a profile of a laser beam outputted from the optical cavity 202 can readily be adjusted into a desired shape. Thus, optical loss or degradation of beam quality can be reduced on a downstream side of the optical cavity 202 while no beam convertor for converting a beam profile into a desired shape is required on the downstream side of the optical cavity 202.

Furthermore, as shown in FIG. 13, a pumping light removal portion 270 that removes at least one of the pumping light that has not been absorbed in the core 21 of the second amplification optical fiber 20 and the pumping light that has not been absorbed in the core 241 of the fourth amplification optical fiber 240 may be provided on the fusion splice portion 252 between the second amplification optical fiber 20 and the fourth amplification optical fiber 240. For example, a resin having a refractive index that is equal to or higher than a refractive index of at least one of the inner cladding layer 22 of the second amplification optical fiber 20 and the inner cladding layer 242 of the fourth amplification optical fiber 240 may be formed so as to cover at least one of the inner cladding layer 22 and the inner cladding layer 242, thereby forming the pumping light removal portion 270. In this case, pumping light that has not been absorbed in the core 21 of the second amplification optical fiber 20 and pumping light that has not been absorbed in the core 241 of the fourth amplification optical fiber 240 are allowed to leak out of the inner cladding layers 22 and 242 into the resin of the pumping light removal portion 270 and can thus be converted into heat, which can be then removed. Therefore, influence from the pumping light that has not been absorbed in the core 21 of the second amplification optical fiber 20 on the amplification in the third amplification optical fiber 130 and the fourth amplification optical fiber 240 can be reduced. Influence from the pumping light that has not been absorbed in the core 241 of the fourth amplification optical fiber 240 on the amplification in the second amplification optical fiber 20 and the first amplification optical fiber 10 can be reduced. Therefore, the power of the laser beam amplified in each of the amplification optical fibers 10, 20, 130, and 240 is increased. As a result, the power of the outputted laser beam can be enhanced while the laser beam is adjusted to have a desired beam profile.

Figure 15:
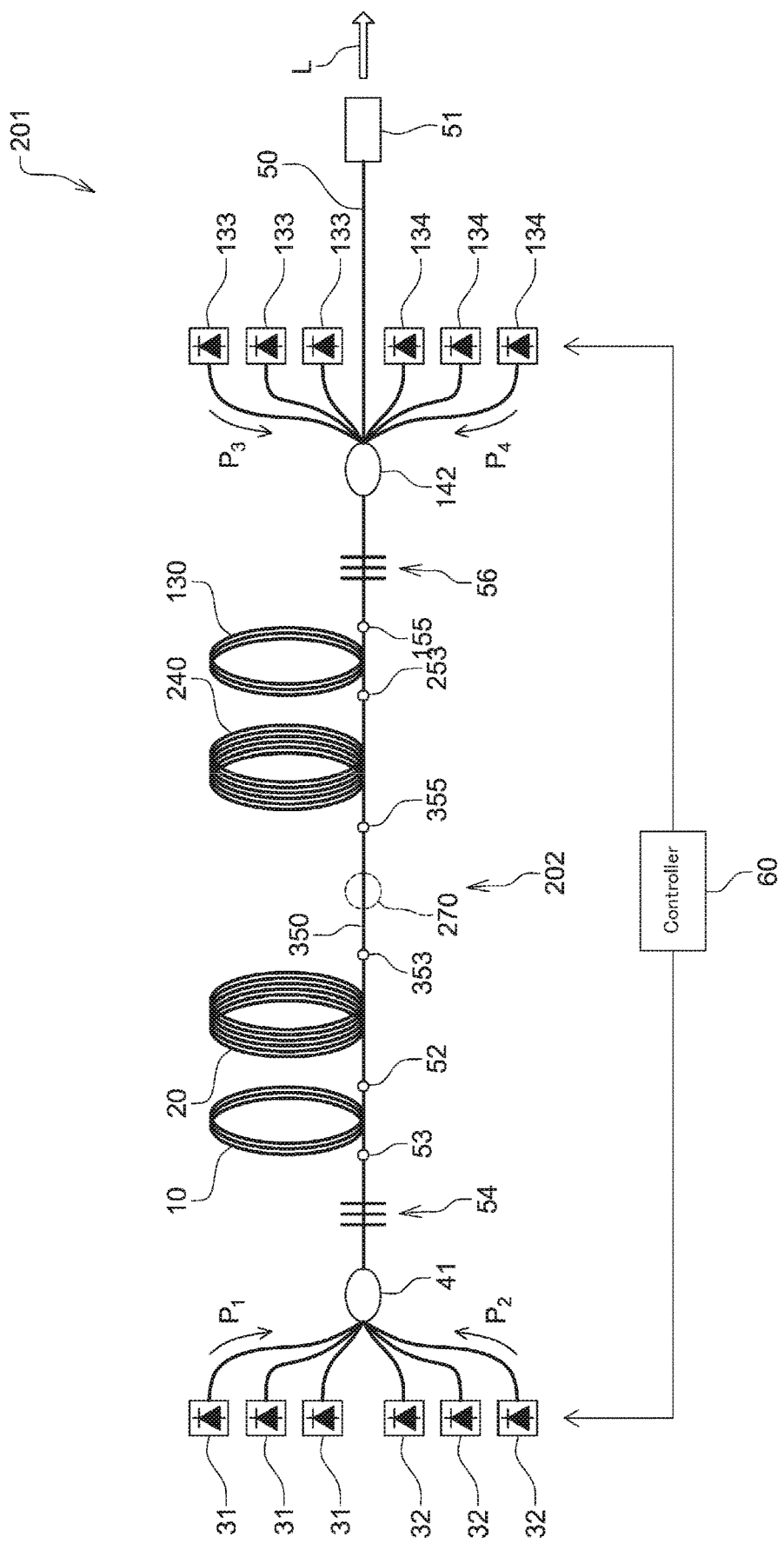
FIG. 15 is a diagram schematically showing a fiber laser system including an optical amplification apparatus according to a fifth embodiment of the present invention.

In the example illustrated in FIG. 13, the second amplification optical fiber 20 and the fourth amplification optical fiber 240 are connected to each other at the fusion splice portion 252 by fusion splicing. As shown in FIG. 15, however, a relay optical fiber 350 having a core to which no active element has been doped may be used to interconnect the second amplification optical fiber 20 and the fourth amplification optical fiber 240. The core of the relay optical fiber 350 may preferably have a refractive index that is equal to the refractive index of the core 21 in the second amplification optical fiber 20 and the refractive index of the core 241 of the fourth amplification optical fiber 240. The inner cladding of the relay optical fiber 350 may preferably have a refractive index that is equal to the refractive index of the inner cladding layer 22 in the second amplification optical fiber 20 and the refractive index of the inner cladding layer 242 in the fourth amplification optical fiber 240.

In the example illustrated in FIG. 15, the relay optical fiber 350 is connected to the second amplification optical fiber 20 at a fusion splice portion 353 by fusion splicing and to the fourth amplification optical fiber 240 at a fusion splice portion 355 by fusion splicing. With this configuration, the aforementioned pumping light removal portion 270 may be provided in the middle of the relay optical fiber 350 as shown in FIG. 15. Alternatively, the pumping light removal portion 270 may be provided on an end of the second amplification optical fiber 20 near the third amplification optical fiber 130 (i.e., a fusion splice portion 353) or on an end of the fourth amplification optical fiber 240 near the first amplification optical fiber 10 (i.e., a fusion splice portion 355).

In the present embodiment, the active element doping concentration distribution of the core 11 in the first amplification optical fiber 10, the active element doping concentration distribution of the core 21 in the second amplification optical fiber 20, the active element doping concentration distribution of the core 131 in the third amplification optical fiber 130, and the active element doping concentration distribution of the core 241 in the fourth amplification optical fiber 240 are not limited to the above examples. Any concentration distributions may be combined with each other and used depending on a required beam profile.

In the above embodiment, a plurality of first pumping light sources 31, a plurality of second pumping light sources 32, a plurality of third pumping light sources 133, and a plurality of fourth pumping light sources 134 are provided. Nevertheless, one first pumping light source 31, one second pumping light source 32, one third pumping light source 133, and one fourth pumping light source 134 may be provided. Furthermore, the wavelength of the pumping light $P_1$ generated by the first pumping light sources 31, the wavelength of the pumping light $P_2$ generated by the second pumping light sources 32, the wavelength of the pumping light $P_3$ generated by the third pumping light sources 133, and the wavelength of the pumping light $P_4$ generated by the fourth pumping light sources 134 are not limited to the above examples. Any combination of the wavelength of the pumping light $P_1$ and the wavelength of the pumping light $P_2$ may be used as long as the absorptance at the wavelength of the pumping light $P_1$ is higher than the absorptance at the wavelength of the pumping light $P_2$. Any combination of the wavelength of the pumping light $P_3$ and the wavelength of the pumping light $P_4$ may be used as long as the absorptance at the wavelength of the pumping light $P_3$ is higher than the absorptance at the wavelength of the pumping light $P_4$. The wavelength of the pumping light $P_1$ may not necessarily be the same as the wavelength of the pumping light $P_3$. The wavelength of the pumping light $P_2$ may not necessarily be the same as the wavelength of the pumping light $P_4$.

Figure 16:
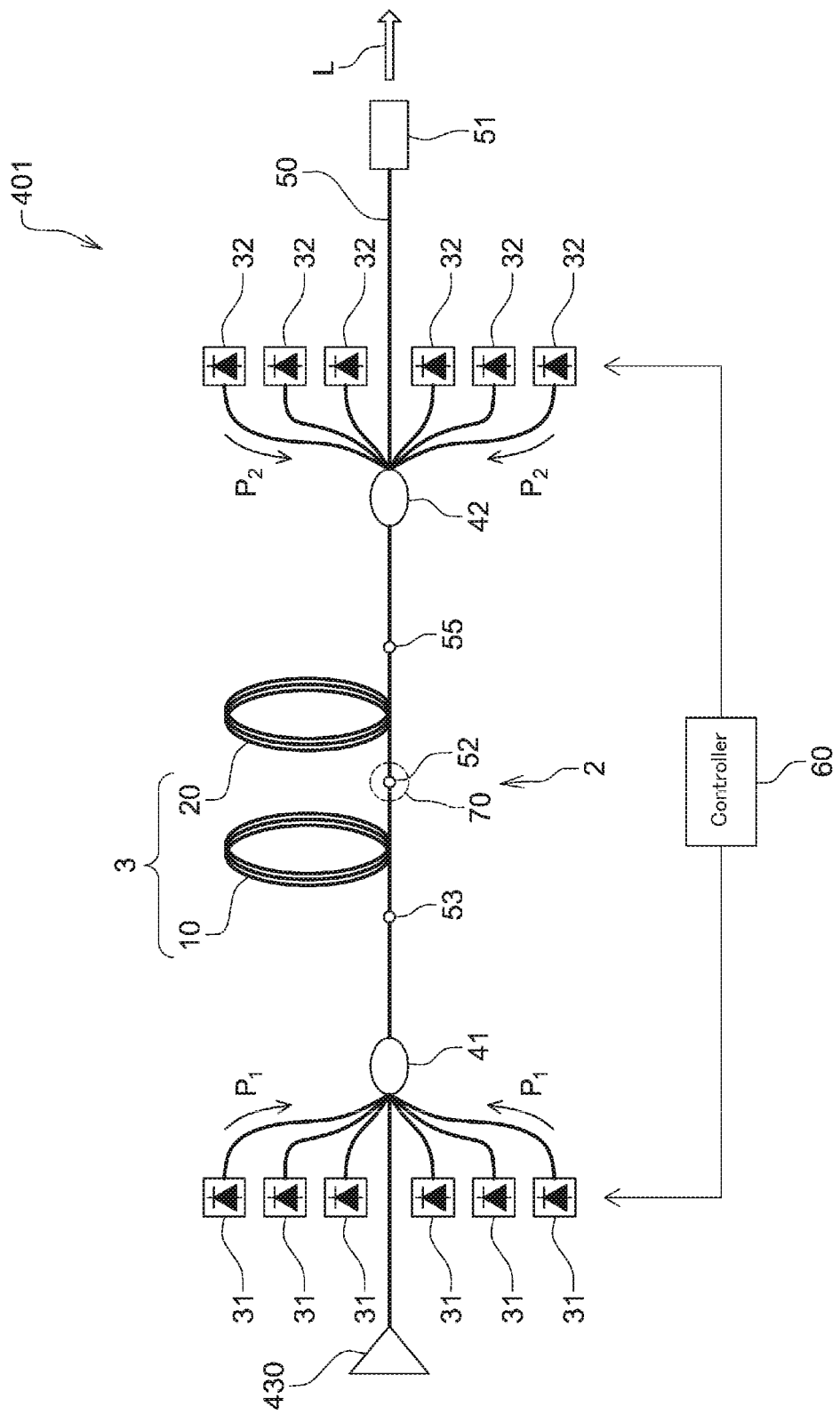
FIG. 16 is a diagram schematically showing a fiber laser system including an optical amplification apparatus according to a sixth embodiment of the present invention.
Figure 17:
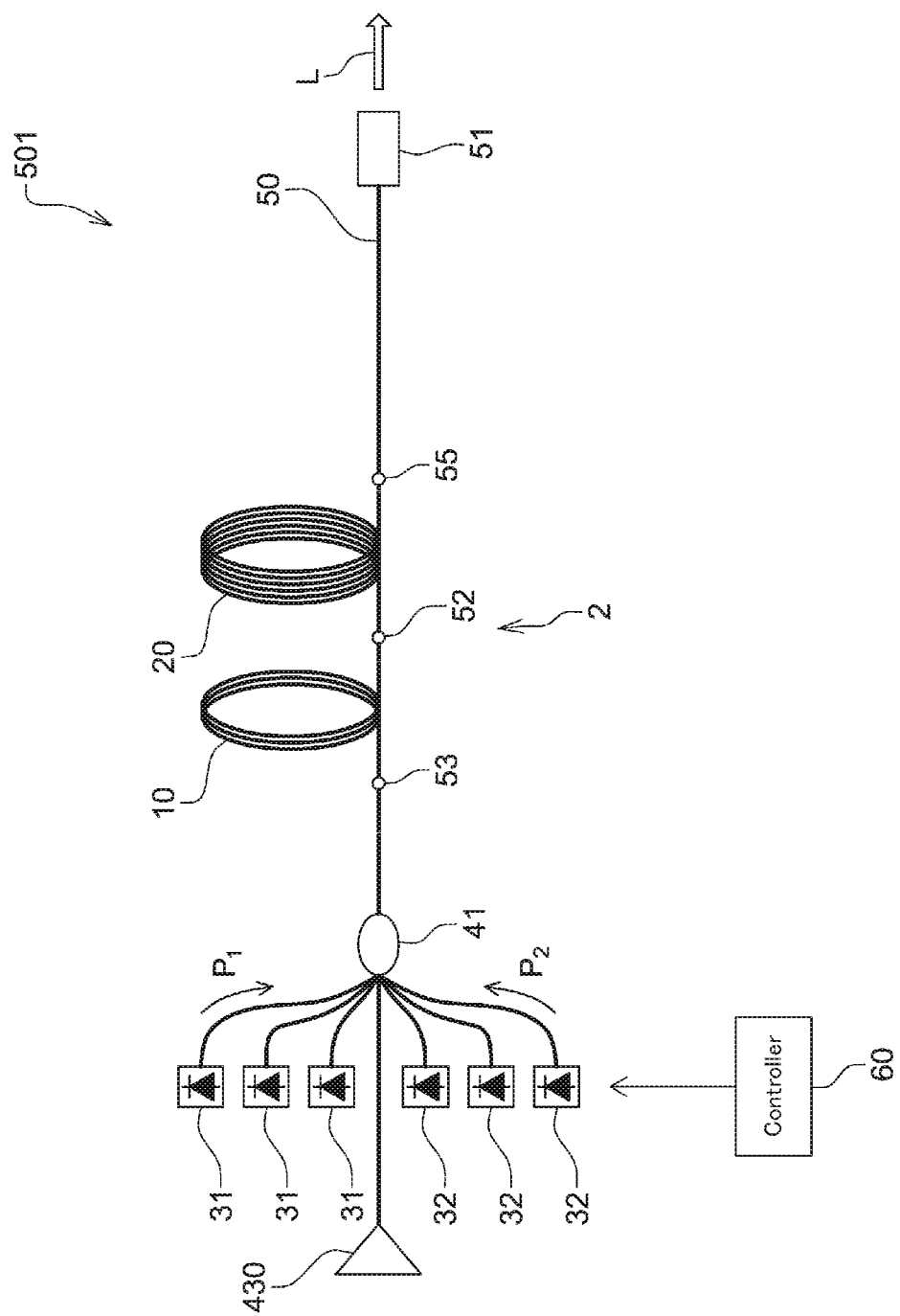
FIG. 17 is a diagram schematically showing a fiber laser system including an optical amplification apparatus according to a seventh embodiment of the present invention.

The aforementioned embodiments describe a fiber laser system 1 having an optical amplification apparatus including an optical cavity 2 by way of example. Nevertheless, the present invention is applicable to other types of optical amplification apparatuses. As shown in FIGS. 16 and 17, for example, an optical amplification apparatus according to the present invention may be applied to MOPA fiber laser systems 401 and 501.

A MOPA fiber laser system 401 as shown in FIG. 16 has a seed light source 430 operable to generate seed light and an optical amplification apparatus as described in the aforementioned first embodiment. The seed light source 430 is connected to the upstream optical combiner 41 and configured to allow seed light to enter the core 11 of the first amplification optical fiber 10 via the upstream optical combiner 41. The seed light from the seed light source 430 propagates through the core 11 of the first amplification optical fiber 10 and the core 21 of the second amplification optical fiber 20. While the pumping light $P_1$ and $P_2$ propagates through the cores 11 and 21, respectively, rare earth element ions doped to the cores 11 and 21 absorb the pumping light $P_1$ and $P_2$ so that the rare earth element ions are excited to amplify the seed light propagating through the cores 11 and 21 by stimulated emission. With this configuration, a propagation mode that is selectively amplified based on the active element doping concentration distribution of the core 11 in the first amplification optical fiber 10 can be controlled primarily by the pumping light $P_1$ from the first pumping light sources 31, and a propagation mode that is selectively amplified based on the active element doping concentration distribution of the core 21 in the second amplification optical fiber 20 can be controlled primarily by the pumping light $P_2$ from the second pumping light sources 32. Therefore, a ratio of the intensity of the pumping light $P_1$ to the intensity of the pumping light $P_2$ can be changed by control of the first pumping light sources 31 and the second pumping light sources 32 with the controller 60, thereby adjusting a ratio of a propagation mode selectively amplified by the first amplification optical fiber 10 to a propagation mode selectively amplified by the second amplification optical fiber 20. Accordingly, a profile of a laser beam outputted from the MOPA fiber laser system 401 can readily be adjusted into a desired shape.

A MOPA fiber laser system 501 as shown in FIG. 17 has a seed light source 430 operable to generate seed light and an optical amplification apparatus as described in the aforementioned second embodiment. The seed light source 430 is connected to the upstream optical combiner 41 and configured to allow seed light to enter the core 11 of the first amplification optical fiber 10 via the upstream optical combiner 41. The seed light from the seed light source 430 propagates through the core 11 of the first amplification optical fiber 10 and the core 21 of the second amplification optical fiber 20. While the pumping light $P_1$ and $P_2$ propagates through the cores 11 and 21, respectively, rare earth element ions doped to the cores 11 and 21 absorb the pumping light $P_1$ and $P_2$ so that the rare earth element ions are excited to amplify the seed light propagating through the cores 11 and 21 by stimulated emission. With this configuration, a propagation mode that is selectively amplified based on the active element doping concentration distribution of the core 11 in the first amplification optical fiber 10 can be controlled primarily by the pumping light $P_1$ having a wavelength of 976 nm from the first pumping light sources 31, and a propagation mode that is selectively amplified based on the active element doping concentration distribution of the core 21 in the second amplification optical fiber 20 can be controlled primarily by the pumping light $P_2$ having a wavelength of 915 nm from the second pumping light sources 32. Therefore, a ratio of the intensity of the pumping light $P_1$ to the intensity of the pumping light $P_2$ can be changed by control of the first pumping light sources 31 and the second pumping light sources 32 with the controller 60, thereby adjusting a ratio of a propagation mode selectively amplified by the first amplification optical fiber 10 to a propagation mode selectively amplified by the second amplification optical fiber 20. Accordingly, a profile of a laser beam outputted from the MOPA fiber laser system 501 can readily be adjusted into a desired shape. As a matter of course, such a seed light source 430 may be applied to the optical amplification apparatus in any of the aforementioned third to fifth embodiments.

Although some preferred embodiments of the present invention have been described, the present invention is not limited to the aforementioned embodiments. It should be understood that various different forms may be applied to the present invention within the technical idea thereof.

According to one or more embodiments of the present invention, there is provided an amplification optical fiber member that can form an optical amplification apparatus that outputs a laser beam having a desired beam profile. The amplification optical fiber member has a first amplification optical fiber and a second amplification optical fiber connected to the first amplification optical fiber in a longitudinal direction of the first amplification optical fiber. The first amplification optical fiber includes a first core to which an active element has been doped with a first active element doping concentration distribution, and a first cladding layer located outside of the first core. The first cladding layer has a refractive index lower than a refractive index of the first core. The second amplification optical fiber includes a second core to which the active element has been doped with a second active element doping concentration distribution different than the first active element doping concentration distribution, and a second cladding layer located outside of the second core. The second cladding layer has a refractive index lower than a refractive index of the second core. The second core is optically connected to the first core of the first amplification optical fiber.

When such an amplification optical fiber member is incorporated into an optical amplification apparatus, a laser beam having a desired beam profile can be outputted without a particular mechanism for changing a beam profile.

The first amplification optical fiber may have stronger tendency to amplify the fundamental propagation mode intensely as compared to higher-order propagation modes than the second amplification optical fiber. Furthermore, the first active element doping concentration distribution may be such that a doping concentration of the active element in a central area of the first core is lower than a doping concentration of the active element in an area outside of the central area.

The second amplification optical fiber may have stronger tendency to amplify a higher-order propagation mode intensely as compared to the fundamental propagation mode than the first amplification optical fiber. Furthermore, the second active element doping concentration distribution may be such that a doping concentration of the active element is the same in the overall area from the center to an outer periphery of the second core. Furthermore, the second active element doping concentration distribution may be such that a doping concentration of the active element at a central area of the second core is higher than a doping concentration of the active element in an area outside of the central area.

According to one or more embodiments of the present invention, there is provided an optical amplification apparatus capable of outputting a laser beam having a desired beam profile without a particular mechanism for changing a beam profile. This optical amplification apparatus has the aforementioned amplification optical fiber member, a first pumping light source operable to generate first pumping light and allow the first pumping light to enter the first cladding layer of the first amplification optical fiber in the amplification optical fiber member from an opposite side of the first amplification optical fiber to the second amplification optical fiber, and a second pumping light source operable to generate second pumping light and allow the second pumping light to enter the second cladding layer of the second amplification optical fiber in the amplification optical fiber member from an opposite side of the second amplification optical fiber to the first amplification optical fiber.

With this configuration, a propagation mode that is selectively amplified based on the first active element doping concentration distribution of the first core in the first amplification optical fiber can be controlled primarily by the first pumping light from the first pumping light source. A propagation mode that is selectively amplified based on the second active element doping concentration distribution of the second core in the second amplification optical fiber can be controlled primarily by the second pumping light from the second pumping light source. Therefore, a ratio of the intensity of the first pumping light outputted from the first pumping light source to the intensity of the second pumping light outputted from the second pumping light source can be changed to adjust a ratio of a propagation mode selectively amplified by the first amplification optical fiber to a propagation mode selectively amplified by the second amplification optical fiber. Accordingly, a profile of a laser beam outputted from the optical amplification apparatus can readily be adjusted into a desired shape. Thus, optical loss or degradation of beam quality can be reduced on a downstream side of the optical amplification apparatus while no beam convertor for converting a beam profile into a desired shape is required on the downstream side of the optical amplification apparatus.

In order to reduce influence from the first pumping light on amplification in the second amplification optical fiber, the first amplification optical fiber may preferably have such a length that at least 90% of the first pumping light is absorbed in the first core. Furthermore, in order to reduce influence from the second pumping light on amplification in the first amplification optical fiber, the second amplification optical fiber may preferably have such a length that at least 90% of the second pumping light is absorbed in the second core.

The optical amplification apparatus may further have a controller operable to control an electric current supplied to the first pumping light source and an electric current supplied to the second pumping light source so that a laser beam having a desired beam profile is outputted.

The optical amplification apparatus may further have a pumping light removal portion located on an end of the first amplification optical fiber near the second amplification optical fiber, on an end of the second amplification optical fiber near the first amplification optical fiber, or between the first amplification optical fiber and the second amplification optical fiber. The pumping light removal portion is configured to remove the first pumping light that has not been absorbed in the first core of the first amplification optical fiber and the second pumping light that has not been absorbed in the second core of the second amplification optical fiber. In this case, the pumping light removal portion may be formed of a resin that covers at least one of the first cladding layer and the second cladding layer at a connection portion between the first amplification optical fiber and the second amplification optical fiber. The resin has a refractive index equal to or higher than a refractive index of the at least one of the first cladding layer and the second cladding layer. In this case, first pumping light that has not been absorbed in the first core of the first amplification optical fiber and second pumping light that has not been absorbed in the second core of the second amplification optical fiber are allowed to leak out of the first cladding layer and the second cladding layer into the resin of the pumping light removal portion and can thus be converted into heat, which can be then removed.

Furthermore, the optical amplification apparatus may further have a seed light source operable to generate seed light and allow the seed light to enter the first core of the first amplification optical fiber or the second core of the second amplification optical fiber in the amplification optical fiber member of the optical amplification apparatus.

According to one or more embodiments of the present invention, there is provided an optical amplification apparatus capable of outputting a laser beam having a desired beam profile. This optical amplification apparatus has a first amplification optical fiber and a second amplification optical fiber connected to the first amplification optical fiber in a longitudinal direction of the first amplification optical fiber. The first amplification optical fiber includes a first core to which an active element has been doped with a first active element doping concentration distribution and a first cladding layer located outside of the first core. The first cladding layer has a refractive index lower than a refractive index of the first core. The second amplification optical fiber includes a second core to which the active element has been doped with a second active element doping concentration distribution different than the first active element doping concentration distribution, and a second cladding layer located outside of the second core. The second cladding layer has a refractive index lower than a refractive index of the second core. The optical amplification apparatus has a first pumping light source operable to generate first pumping light having a first wavelength and allow the first pumping light to enter the first cladding layer of the first amplification optical fiber from an opposite side of the first amplification optical fiber to the second amplification optical fiber and a second pumping light source operable to generate second pumping light having a second wavelength at which an absorptance of light to the active element is lower than an absorptance of light at the first wavelength and allow the second pumping light to enter the first cladding layer of the first amplification optical fiber from an opposite side of the first amplification optical fiber to the second amplification optical fiber. The first amplification optical fiber has such a length that a portion of the second pumping light transmits therethrough.

With this configuration, a propagation mode that is selectively amplified based on the first active element doping concentration distribution of the first core in the first amplification optical fiber can be controlled primarily by the first pumping light from the first pumping light source. A propagation mode that is selectively amplified based on the second active element doping concentration distribution of the second core in the second amplification optical fiber can be controlled primarily by the second pumping light from the second pumping light source. Therefore, a ratio of the intensity of the first pumping light outputted from the first pumping light source to the intensity of the second pumping light outputted from the second pumping light source can be changed to adjust a ratio of a propagation mode selectively amplified by the first amplification optical fiber to a propagation mode selectively amplified by the second amplification optical fiber. Accordingly, a profile of a laser beam outputted from the optical amplification apparatus can readily be adjusted into a desired shape. Thus, optical loss or degradation of beam quality can be reduced on a downstream side of the optical amplification apparatus while no beam convertor for converting a beam profile into a desired shape is required on the downstream side of the optical amplification apparatus.

In order to reduce influence from the second pumping light on amplification in the first amplification optical fiber and increase influence from the second pumping light on amplification in the second amplification optical fiber, the first amplification optical fiber may preferably have such a length that less than 50% of the second pumping light is absorbed in the first core. The second amplification optical fiber may preferably be longer than the first amplification optical fiber, so that the second pumping light having the second wavelength, which has a low absorptance, can sufficiently be absorbed in the second core of the second amplification optical fiber.

The optical amplification apparatus may further have a controller operable to control an electric current supplied to the first pumping light source and an electric current supplied to the second pumping light source so that a laser beam having a desired beam profile is outputted.

The optical amplification apparatus may further have a third amplification optical fiber connected to the second amplification optical fiber on an opposite side to the first amplification optical fiber in a longitudinal direction of the second amplification optical fiber. The third amplification optical fiber includes a third core optically connected to the second core of the second amplification optical fiber and a third cladding layer located outside of the third core. The third cladding layer has a refractive index lower than a refractive index of the third core. The active element has been doped to the third core with a third active element doping concentration distribution different than the second active element doping concentration distribution. The optical amplification apparatus may further have a third pumping light source operable to generate third pumping light having a third wavelength at which an absorptance of light to the active element is higher than the absorptance of light at the second wavelength and allow the third pumping light to enter the third cladding layer of the third amplification optical fiber from an opposite side to the second amplification optical fiber.

With this configuration, a propagation mode that is selectively amplified based on the first active element doping concentration distribution of the first core in the first amplification optical fiber can be controlled primarily by the first pumping light from the first pumping light source. A propagation mode that is selectively amplified based on the second active element doping concentration distribution of the second core in the second amplification optical fiber can be controlled primarily by the second pumping light from the second pumping light source. A propagation mode that is selectively amplified based on the third active element doping concentration distribution of the third core in the third amplification optical fiber can be controlled primarily by the third pumping light from the third pumping light source. Therefore, a ratio of the intensity of the first pumping light outputted from the first pumping light source, the intensity of the second pumping light outputted from the second pumping light source, and the intensity of the third pumping light outputted from the third pumping light source can be changed to adjust a ratio of a propagation mode selectively amplified by the first amplification optical fiber, a propagation mode selectively amplified by the second amplification optical fiber, and a propagation mode selectively amplified by the third amplification optical fiber. Accordingly, a profile of a laser beam outputted from the optical amplification apparatus can readily be adjusted into a desired shape. Thus, optical loss or degradation of beam quality can be reduced on a downstream side of the optical amplification apparatus while no beam convertor for converting a beam profile into a desired shape is required on the downstream side of the optical amplification apparatus.

In this case, the optical amplification apparatus may further have a controller operable to control an electric current supplied to the first pumping light source, an electric current supplied to the second pumping light source, and an electric current supplied to the third pumping light source so that a laser beam having a desired beam profile is outputted. Furthermore, the optical amplification apparatus may further have a fourth pumping light source operable to generate fourth pumping light having a fourth wavelength at which an absorptance of light to the active element is lower than the absorptance of light at the third wavelength and allow the fourth pumping light to enter the third cladding layer of the third amplification optical fiber from an opposite side to the second amplification optical fiber.

The optical amplification apparatus may further have a third amplification optical fiber and a fourth amplification optical fiber connected between the second amplification optical fiber and the third amplification optical fiber in a longitudinal direction of the second amplification optical fiber and the third amplification optical fiber. The third amplification optical fiber includes a third core to which the active element has been doped with a third active element doping concentration distribution and a third cladding layer located outside of the third core. The third cladding layer has a refractive index lower than a refractive index of the third core. The fourth amplification optical fiber includes a fourth core optically connected to the second core of the second amplification optical fiber and the third core of the third amplification optical fiber and a fourth cladding layer located outside of the fourth core. The fourth cladding layer has a refractive index lower than a refractive index of the fourth core. The active element has been doped to the fourth core with a fourth active element doping concentration distribution different than the third active element doping concentration distribution. The optical amplification apparatus may further have a third pumping light source operable to generate third pumping light having a third wavelength and allow the third pumping light to enter the third cladding layer of the third amplification optical fiber from an opposite side to the second amplification optical fiber and a fourth pumping light source operable to generate fourth pumping light having a fourth wavelength at which an absorptance of light to the active element is lower than the absorptance of light at the third wavelength and allow the fourth pumping light to enter the third cladding layer of the third amplification optical fiber from an opposite side to the second amplification optical fiber. The third amplification optical fiber may have such a length that a portion of the fourth pumping light transmits therethrough.

With this configuration, a propagation mode that is selectively amplified based on the first active element doping concentration distribution of the first core in the first amplification optical fiber can be controlled primarily by the first pumping light from the first pumping light source. A propagation mode that is selectively amplified based on the second active element doping concentration distribution of the second core in the second amplification optical fiber can be controlled primarily by the second pumping light from the second pumping light source. A propagation mode that is selectively amplified based on the third active element doping concentration distribution of the third core in the third amplification optical fiber can be controlled primarily by the third pumping light from the third pumping light source. A propagation mode that is selectively amplified based on the fourth active element doping concentration distribution of the fourth core in the fourth amplification optical fiber can be controlled primarily by the fourth pumping light from the fourth pumping light source. Therefore, a ratio of the intensity of the first pumping light outputted from the first pumping light source, the intensity of the second pumping light outputted from the second pumping light source, the intensity of the third pumping light outputted from the third pumping light source, and the intensity of the fourth pumping light outputted from the fourth pumping light source can be changed to adjust a ratio of a propagation mode selectively amplified by the first amplification optical fiber, a propagation mode selectively amplified by the second amplification optical fiber, a propagation mode selectively amplified by the third amplification optical fiber, and a propagation mode selectively amplified by the fourth amplification optical fiber. Accordingly, a profile of a laser beam outputted from the optical amplification apparatus can readily be adjusted into a desired shape. Thus, optical loss or degradation of beam quality can be reduced on a downstream side of the optical amplification apparatus while no beam convertor for converting a beam profile into a desired shape is required on the downstream side of the optical amplification apparatus.

In order to reduce influence from the fourth pumping light on amplification in the third amplification optical fiber and increase influence from the fourth pumping light on amplification in the fourth amplification optical fiber, the third amplification optical fiber may preferably have such a length that less than 50% of the fourth pumping light is absorbed in the third core. The fourth amplification optical fiber may preferably be longer than the third amplification optical fiber, so that the fourth pumping light having the fourth wavelength, which has a low absorptance, can sufficiently be absorbed in the fourth core of the fourth amplification optical fiber.

The optical amplification apparatus may further have a controller operable to control the first pumping light source, the second pumping light source, the third pumping light source, and the fourth pumping light source so that a laser beam having a desired beam profile is outputted.

The optical amplification apparatus may further have a pumping light removal portion disposed on an end of the second amplification optical fiber near the fourth amplification optical fiber, on an end of the fourth amplification optical fiber near the second amplification optical fiber, or between the second amplification optical fiber and the fourth amplification optical fiber. The pumping light removal portion is configured to remove the first pumping light and the second pumping light that have not been absorbed in the first core of the first amplification optical fiber or the second core of the second amplification optical fiber, and the third pumping light and the fourth pumping light that have not been absorbed in the third core of the third amplification optical fiber or the fourth core of the fourth amplification optical fiber. In this case, the pumping light removal portion may be formed of a resin that covers at least one of the second cladding layer and the fourth cladding layer at a connection portion between the second amplification optical fiber and the fourth amplification optical fiber. The resin has a refractive index equal to or higher than a refractive index of the at least one of the second cladding layer and the fourth cladding layer. In this case, the first pumping light and the second pumping light that have not been absorbed in the first core of the first amplification optical fiber or the second core of the second amplification optical fiber and the third pumping light and the fourth pumping light that have not been absorbed in the third core of the third amplification optical fiber or the fourth core of the fourth amplification optical fiber are allowed to leak out of the second cladding layer and the fourth cladding layer into the resin of the pumping light removal portion and can thus be converted into heat, which can be then removed.

Furthermore, the optical amplification apparatus may further have a seed light source operable to generate seed light and allow the seed light to enter the first core of the first amplification optical fiber of the optical amplification apparatus.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS AND SIGNS

1 Fiber laser system
2 Optical cavity
3 Amplification optical fiber member
10 First amplification optical fiber
11 (First) core
12 Inner cladding layer (first cladding layer)
13 Outer cladding layer
20 Second amplification optical fiber
21 (Second) core
22 Inner cladding layer (second cladding layer)
23 Outer cladding layer
31 First pumping light source
32 Second pumping light source
41 Upstream optical combiner
42 Downstream optical combiner
50 Delivery fiber
51 Laser emission portion
52, 53, 55 Fusion splice portion
54 High-reflectivity FBG portion
56 Low-reflectivity FBG portion
60 Controller
70 Pumping light removal portion
101 Fiber laser system
102 Optical cavity
130 Third amplification optical fiber
131 (Third) core
132 Inner cladding layer (third cladding layer)
133 Third pumping light source 134 Fourth pumping light source
135 Outer cladding layer
142 Downstream optical combiner
152, 155 Fusion splice portion
201 Fiber laser system
202 Optical cavity
240 Fourth amplification optical fiber
241 (Fourth) core
242 Inner cladding layer (fourth cladding layer)
243 Outer cladding layer
252, 153 Fusion splice portion
270 Pumping light removal portion
350 Relay optical fiber
353, 355 Fusion splice portion
430 Seed light source
$P_1$ (First) pumping light
$P_2$ (Second) pumping light
$P_3$ (Third) pumping light
$P_4$ (Fourth) pumping light

The invention claimed is:

1. An optical amplification apparatus comprising:
a first amplification optical fiber including:
   a first core that is doped with an active element using a first active element doping concentration distribution, and
   a first cladding layer disposed outside of the first core, the first cladding layer having a refractive index lower than a refractive index of the first core;
a second amplification optical fiber that is connected to the first amplification optical fiber in a longitudinal direction of the first amplification optical fiber, the second amplification optical fiber including:
   a second core that is doped with the active element using a second active element doping concentration distribution that is different from the first active element doping concentration distribution, the second core being optically connected to the first core of the first amplification optical fiber, and
   a second cladding layer disposed outside of the second core, the second cladding layer having a refractive index lower than a refractive index of the second core,
a first pumping light source that generates a first pumping light and allows the first pumping light to enter either of the first cladding layer in the first amplification optical fiber and the second cladding layer in the second amplification optical fiber; and
a second pumping light source that generates a second pumping light and allows the second pumping light to enter either of the first cladding layer in the first amplification optical fiber and the second cladding layer in the second amplification optical fiber,
wherein
   the first pumping light source allows the first pumping light to enter the first cladding layer of the first amplification optical fiber from an opposite side of the first amplification optical fiber to the second amplification optical fiber, and
   the second pumping light source allows the second pumping light to enter the second cladding layer of the second amplification optical fiber from an opposite side of the second amplification optical fiber to the first amplification optical fiber.

2. An optical amplification apparatus comprising:
a first amplification optical fiber including:
   a first core that is doped with an active element using a first active element doping concentration distribution, and
   a first cladding layer disposed outside of the first core, the first cladding layer having a refractive index lower than a refractive index of the first core;
a second amplification optical fiber that is connected to the first amplification optical fiber in a longitudinal direction of the first amplification optical fiber, the second amplification optical fiber including:
   a second core that is doped with the active element using a second active element doping concentration distribution that is different from the first active element doping concentration distribution, the second core being optically connected to the first core of the first amplification optical fiber, and
   a second cladding layer disposed outside of the second core, the second cladding layer having a refractive index lower than a refractive index of the second core,
a first pumping light source that generates a first pumping light and allows the first pumping light to enter either of the first cladding layer in the first amplification optical fiber and the second cladding layer in the second amplification optical fiber; and
a second pumping light source that generates a second pumping light and allows the second pumping light to enter either of the first cladding layer in the first amplification optical fiber and the second cladding layer in the second amplification optical fiber,
wherein
   the first pumping light has a first wavelength,
   the second pumping light has a second wavelength at which an absorptance of light by the active element is lower than an absorptance of light at the first wavelength,
   the first pumping light source allows the first pumping light to enter the first cladding layer of the first amplification optical fiber from an opposite side of the first amplification optical fiber to the second amplification optical fiber,
   the second pumping light source allows the second pumping light to enter the first cladding layer of the first amplification optical fiber from an opposite side of the first amplification optical fiber to the second amplification optical fiber, and
   the first amplification optical fiber has such a length that a portion of the second pumping light transmits therethrough.

3. The optical amplification apparatus as recited in claim 2, wherein the first amplification optical fiber has such a length that less than 50% of the second pumping light is absorbed in the first core.

4. The optical amplification apparatus as recited in claim 2, wherein the second amplification optical fiber is longer than the first amplification optical fiber.

5. The optical amplification apparatus as recited in claim 2, further comprising a controller that controls an output beam profile by controlling the first pumping light source and the second pumping light source.

6. The optical amplification apparatus as recited in claim 2, further comprising:
a third amplification optical fiber connected to the second amplification optical fiber on an opposite side to the first amplification optical fiber in a longitudinal direction of the second amplification optical fiber, the third amplification optical fiber including:

a third core that is doped with the active element using a third active element doping concentration distribution that is different from the second active element doping concentration distribution, the third core being optically connected to the second core of the second amplification optical fiber, and a third cladding layer disposed outside of the third core, the third cladding layer having a refractive index lower than a refractive index of the third core; and a third pumping light source that generates a third pumping light having a third wavelength, at which an absorptance of light by the active element is higher than the absorptance of light at the second wavelength, and that allows the third pumping light to enter the third cladding layer of the third amplification optical fiber from an opposite side to the second amplification optical fiber.

7. The optical amplification apparatus as recited in claim 6, further comprising a controller that controls an output beam profile by controlling the first pumping light source, the second pumping light source, and the third pumping light source.

8. The optical amplification apparatus as recited in claim 6, further comprising a fourth pumping light source that generates a fourth pumping light having a fourth wavelength, at which an absorptance of light to the active element is lower than the absorptance of light at the third wavelength, and that allows the fourth pumping light to enter the third cladding layer of the third amplification optical fiber from an opposite side of the second amplification optical fiber.

9. The optical amplification apparatus as recited in claim 2, further comprising:
a third amplification optical fiber including:
a third core to that is doped with the active element using a third active element doping concentration distribution,
a third cladding layer disposed outside of the third core, the third cladding layer having a refractive index lower than a refractive index of the third core;
a fourth amplification optical fiber connected between the second amplification optical fiber and the third amplification optical fiber, in a longitudinal direction of the second amplification optical fiber and the third amplification optical fiber, the fourth amplification optical fiber including:
a fourth core that is doped with the active element using a fourth active element doping concentration distribution that is different from the third active element doping concentration distribution, the fourth core being optically connected to the second core of the second amplification optical fiber and the third core of the third amplification optical fiber, and
a fourth cladding layer disposed outside of the fourth core, the fourth cladding layer having a refractive index lower than a refractive index of the fourth core;

a third pumping light source that generates a third pumping light having a third wavelength, and that allows the third pumping light to enter the third cladding layer of the third amplification optical fiber from an opposite side to the second amplification optical fiber; and a fourth pumping light source that generates a fourth pumping light having a fourth wavelength, at which an absorptance of light by the active element is lower than the absorptance of light at the third wavelength, and that allows the fourth pumping light to enter the third cladding layer of the third amplification optical fiber from an opposite side to the second amplification optical fiber, wherein the third amplification optical fiber has such a length that a portion of the fourth pumping light transmits therethrough.

10. The optical amplification apparatus as recited in claim 9, wherein the third amplification optical fiber has such a length that less than 50% of the fourth pumping light is absorbed in the third core.

11. The optical amplification apparatus as recited in claim 9, wherein the fourth amplification optical fiber is longer than the third amplification optical fiber.

12. The optical amplification apparatus as recited in claim 9, further comprising a controller that controls an output beam profile by controlling the first pumping light source, the second pumping light source, the third pumping light source, and the fourth pumping light source.

13. The optical amplification apparatus as recited in claim 9, further comprising a pumping light removal portion, wherein
the pumping light removal portion is disposed on an end of the second amplification optical fiber that is connected to the fourth amplification optical fiber, on an end of the fourth amplification optical fiber that is connected to the second amplification optical fiber, or between the second amplification optical fiber and the fourth amplification optical fiber, and
the pumping light removal portion removes:
the first pumping light and the second pumping light that have not been absorbed in the first core of the first amplification optical fiber or the second core of the second amplification optical fiber, and
the third pumping light and the fourth pumping light that have not been absorbed in the third core of the third amplification optical fiber or the fourth core of the fourth amplification optical fiber.

14. The optical amplification apparatus as recited in claim 13, wherein the pumping light removal portion comprises a resin that covers at least one of the second cladding layer and the fourth cladding layer at a connection portion between the second amplification optical fiber and the fourth amplification optical fiber, the resin having a refractive index equal to or higher than a refractive index of the at least one of the second cladding layer and the fourth cladding layer.

* * * * *